United States Patent
Kim

(10) Patent No.: US 12,199,282 B2
(45) Date of Patent: *Jan. 14, 2025

(54) HALOGENATED BATTERY COMPRISING A GREENHOUSE GAS

(71) Applicant: Jangwoo Kim, Cedar Park, TX (US)

(72) Inventor: Jangwoo Kim, Austin, TX (US)

(73) Assignee: WATTRII Inc., Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,272

(22) Filed: Sep. 14, 2021

(65) Prior Publication Data

US 2022/0093922 A1    Mar. 24, 2022

Related U.S. Application Data

(60) Provisional application No. 63/080,161, filed on Sep. 18, 2020.

(51) Int. Cl.

| | | |
|---|---|---|
| *H01M 4/58* | (2010.01) | |
| *H01M 4/1315* | (2010.01) | |
| *H01M 4/38* | (2006.01) | |
| *H01M 4/485* | (2010.01) | |
| *H01M 4/62* | (2006.01) | |
| *H01M 4/66* | (2006.01) | |
| *H01M 10/0525* | (2010.01) | |
| *H01M 10/0567* | (2010.01) | |
| *H01M 10/0569* | (2010.01) | |
| *H01M 4/02* | (2006.01) | |
| *H01M 4/04* | (2006.01) | |
| *H01M 4/525* | (2010.01) | |
| *H01M 4/583* | (2010.01) | |
| *H01M 10/0568* | (2010.01) | |

(52) U.S. Cl.
CPC ......... *H01M 4/582* (2013.01); *H01M 4/1315* (2013.01); *H01M 4/381* (2013.01); *H01M 4/382* (2013.01); *H01M 4/388* (2013.01); *H01M 4/485* (2013.01); *H01M 4/625* (2013.01); *H01M 4/662* (2013.01); *H01M 10/0525* (2013.01); *H01M 10/0567* (2013.01); *H01M 10/0569* (2013.01); *H01M 2004/027* (2013.01); *H01M 2004/028* (2013.01); *H01M 4/0404* (2013.01); *H01M 4/0419* (2013.01); *H01M 4/525* (2013.01); *H01M 4/5825* (2013.01); *H01M 4/583* (2013.01); *H01M 10/0568* (2013.01)

(58) Field of Classification Search
CPC .... H01M 4/582; H01M 4/1315; H01M 4/388; H01M 4/381; H01M 4/382; H01M 4/525; H01M 4/5825; H01M 4/485; H01M 4/625; H01M 2004/028; H01M 10/0525; H01M 10/0567
See application file for complete search history.

(56) References Cited

U.S. PATENT DOCUMENTS

| | | | |
|---|---|---|---|
| 8,263,267 B2 | 9/2012 | Kim | |
| 8,580,439 B1 | 11/2013 | Kaiser | |
| 9,831,489 B2 | 11/2017 | Kawada | |
| 9,960,451 B1 | 5/2018 | Zhamu | |
| 11,380,893 B1 * | 7/2022 | Kim | H01M 4/582 |
| 2002/0076610 A1 | 6/2002 | Morioka | |
| 2002/0136947 A1 | 9/2002 | Spillman | |
| 2003/0175583 A1 | 9/2003 | Suzuki | |
| 2003/0207178 A1 | 11/2003 | Hu | |
| 2007/0231707 A1 * | 10/2007 | Abe | H01M 10/0567 429/340 |
| 2008/0020279 A1 | 1/2008 | Schmidt | |
| 2011/0189546 A1 | 8/2011 | Ikeda | |
| 2011/0244331 A1 | 10/2011 | Karthikey | |
| 2012/0028106 A1 | 2/2012 | Saruwatari | |
| 2012/0034533 A1 | 2/2012 | Hong | |
| 2012/0214075 A1 | 8/2012 | Johnson | |
| 2013/0330598 A1 | 12/2013 | Shim | |
| 2015/0056507 A1 * | 2/2015 | Dadheech | H01M 4/366 429/218.1 |
| 2016/0049655 A1 | 2/2016 | Fasching | |
| 2017/0047564 A1 | 2/2017 | Bianchi | |
| 2017/0207449 A1 | 7/2017 | Kang | |
| 2020/0035998 A1 | 1/2020 | Lu | |

FOREIGN PATENT DOCUMENTS

WO    WO 2018/067533    *   4/2018

* cited by examiner

*Primary Examiner* — Laura Weiner
(74) *Attorney, Agent, or Firm* — Raven Patents, LLC; Anton E. Skaugset

(57) ABSTRACT

Disclosed herein are batteries comprising cathodes having halogenated compounds as cathode active materials and including a greenhouse gas within the battery. The halogenated batteries can be operated under an atmosphere comprising a greenhouse gas, wherein the battery is fabricated under a greenhouse gas atmosphere, or wherein the greenhouse gas is introduced into the battery before use. Also disclosed herein are methods of fabricating batteries comprising cathodes having halogenated compounds as cathode active materials and including a greenhouse gas within the battery. The halogenated batteries can include an aliphatic nitrile compound as part of the electrolyte, an organic material having a conjugated cyclic structure as part of the cathode active material, or a metal oxide as part of the anode active material to improve the battery performance.

12 Claims, 21 Drawing Sheets

HALOGENATED BATTERY COMPRISING A GREENHOUSE GAS

CROSS-REFERENCE TO RELATED PATENT APPLICATIONS

This application claims the benefit of and priority to U.S. Provisional Patent Application No. 63/080,161, filed Sep. 18, 2020, the entire disclosures of which are hereby incorporated by reference herein.

FIELD

The present application relates generally to halogenated batteries comprising an anode, a cathode, and an electrolyte. The halogenated batteries can be operated under an atmosphere comprising a greenhouse gas, wherein the battery is fabricated under a greenhouse gas atmosphere, or wherein the greenhouse gas is introduced into the battery before use. The present application also relates to halogenated batteries comprising an aliphatic nitrile compound as part of the electrolyte, an organic material having a conjugated cyclic structure as part of the cathode active material, or a metal oxide as part of the anode active material.

BACKGROUND

Batteries are in high demand for a wide range of applications, from small batteries for industrial and medical devices, to larger batteries for electric vehicles and grid energy storage systems. The most well-known and widely used batteries are lithium-ion batteries, which use an intercalated lithium compound as one electrode material and have lithium ions move back and forth between the cathode and anode in the pond of electrolyte. Low cycle life, slow charging rate, poor temperature performance and high materials costs may adversely impact the widespread adoption of such batteries in certain applications. It would therefore be advantageous to provide an improved battery that addresses these and other issues.

SUMMARY

The present application discloses a battery that advantageously exhibits fast charging and long battery life, which may be produced relatively inexpensively by virtue of using a halogenated (e.g., iodized) compound as a cathode active material. The battery may be fabricated in a greenhouse gas atmosphere according to an exemplary embodiment. According to another exemplary embodiment, the gas may be introduced into the battery to displace all or a portion of the gas that may be present within the battery. Advantageously, batteries produced in accordance with the present disclosure exhibit an improvement in cycle life, applicable current, self-discharge rate, specific capacity, operating voltage, and low-temperature performance.

In one aspect, which may be combined with any other aspect or embodiment, the present disclosure relates to a battery, comprising: a cathode comprising a halogenated compound as a cathode active material; an anode comprising an anode active material; an electrolyte comprising an electrolytic solvent, wherein the electrolytic solvent is between the cathode and the anode and in contact with the cathode and the anode; and an exterior housing enclosing the cathode, the anode, the electrolyte, and a gaseous atmosphere, wherein the gaseous atmosphere comprises a greenhouse gas. In some embodiments, one or both of the cathode and the anode further comprises an electrically-conductive material comprising a porous carbon in contact with the cathode active material. In some embodiments, the porous carbon material is selected from the group consisting of carbon black, carbon nanotubes, carbon nanofibers, carbon dots, activated carbon, graphite, graphene, graphene oxide, reduced graphene oxide, graphene nanoribbons, and combinations thereof. In some embodiments, the porous carbon material is doped with one or more heteroatoms selected from the group consisting of boron, oxygen, nitrogen, sulfur, phosphorous, fluorine, chlorine, bromine, and combinations thereof.

In some embodiments, the electrolyte comprises an aliphatic nitrile compound. In some embodiments, the battery further comprises an electrolyte additive, wherein the electrolyte additive comprises a heterocyclic compound comprising at least one nitrogen atom in its ring.

In some embodiments, the cathode further comprises an organic material having a conjugated cyclic structure. In some embodiments, the halogenated compound comprises an organic moiety. In some embodiments, the cathode and/or the electrolyte further comprise(s) a plasticizer. In some embodiments, the cathode and/or the electrolyte further comprise(s) a carboxylic acid.

In some embodiments, the greenhouse gas comprises carbon dioxide ($CO_2$), carbon monoxide (CO), ozone ($O_3$), methane ($CH_4$), tetrafluoromethane ($CF_4$), hexafluoroethane ($C_2F_6$), sulfur hexafluoride ($SF_6$), carbon tetrachloride ($CCl_4$), nitrous oxide ($N_2O$), sulfur dioxide ($SO_2$), carbon disulfide ($CS_2$), and carbonyl sulfide (COS), one or more perfluorocarbons, one or more chlorofluorocarbons, one or more hydrofluorocarbons, or a combination thereof. In some embodiments, the greenhouse gas comprises carbon dioxide. In some embodiments, the greenhouse gas is excluded from an electrochemical reaction during one or more of charging and discharging of the battery.

In some embodiments, the battery further comprises a cathode current collector, wherein the cathode current collector is in contact with the cathode, and the cathode is between the electrolyte and the cathode current collector. In some embodiments, the cathode current collector comprises a metal alloy having at least one material selected from the group consisting of molybdenum, titanium, zirconium, and combinations thereof.

In some embodiments, the battery further comprises an anode current collector, wherein the anode current collector is in contact with the anode, and the anode is between the electrolyte and the anode current collector. In some embodiments, the anode current collector comprises a metal alloy having at least one material selected from the group consisting of molybdenum, titanium, zirconium, and combinations thereof.

In some embodiments, the halogenated compound is soluble in the electrolytic solvent. In some embodiments, the halogenated compound has a solubility of greater than 1 mmol/L in the electrolytic solvent at room temperature. In some embodiments, the halogenated compound has a solubility of greater than 10 mmol/L in the electrolytic solvent at room temperature.

In one aspect, which may be combined with any other aspect or embodiment, the present disclosure relates to a method for producing a battery, comprising: inserting cell components into an exterior housing in the following order: (1) an anode current collector; (2) an anode; (3) an electrolyte; (4) a cathode; and (5) a cathode current collector, or vice versa, wherein: the electrolyte is between the cathode and the anode; the cathode is between the cathode current collector and the electrolyte; and the anode is between the anode current collector and the electrolyte; compressing the cell components so that the electrolyte is homogeneously in contact with the anode and the cathode; enclosing the cell in the exterior housing under a greenhouse gas-rich atmosphere; charging and/or discharging the battery at least one time; opening the battery to displace forming gas generated during the charge and/or discharge cycle; and closing the cell under the greenhouse gas-rich atmosphere or an inert gas-rich atmosphere.

In some embodiments, the cathode comprises a halogenated compound.

In some embodiments, the electrolyte comprises an aliphatic nitrile compound.

In some embodiments, the charging and/or discharging is conducted at a current density of 0.1 $mA/cm^2$ or less.

In some embodiments, the cathode is produced by a method comprising: casting the cathode active material from solution; and drying the cast cathode active material under vacuum at a temperature of about 30° C. or less.

In one aspect, which may be combined with any other aspect or embodiment, the present disclosure relates to a method for producing a battery, comprising: inserting cell components into an exterior housing in the following order: (1) an anode current collector; (2) an anode; (3) an electrolyte; (4) a cathode; and (5) a cathode current collector, or vice versa, wherein: the electrolyte is between the cathode and the anode; the cathode is between the cathode current collector and the electrolyte; and the anode is between the anode current collector and the electrolyte; compressing the cell components so that the electrolyte is homogeneously in contact with the anode and the cathode; enclosing the cell in the exterior housing under an atmosphere that is not greenhouse gas-rich; purging the cell with a greenhouse gas to create a greenhouse gas-rich atmosphere within the cell; charging and/or discharging the battery at least one time; opening the battery to displace forming gas generated during the charge and/or discharge cycle; and performing one of the following steps: closing the cell under a greenhouse gas-rich atmosphere; closing the cell under an atmosphere that is not greenhouse gas-rich and then purging the cell with a greenhouse gas to create a greenhouse gas-rich atmosphere within the cell; or closing the cell under an inert gas-rich atmosphere.

In some embodiments, the cathode comprises a halogenated compound as a cathode active material.

In some embodiments, the electrolyte comprises an aliphatic nitrile compound.

In some embodiments, the charging and/or discharging is conducted at a current density of 0.1 $mA/cm^2$ or less.

In some embodiments, the cathode is produced by a method comprising: casting the cathode active material from solution; and drying the cast cathode active material under vacuum at a temperature of about 30° C. or less.

In an aspect, which may be combined with any other aspect or embodiment, the present disclosure relates to a battery, comprising: a cathode comprising a halogenated compound as a cathode active material; an electrolyte comprising at least three carbonate compounds; and an exterior housing enclosing the cathode, the electrolyte, and a gaseous atmosphere, wherein the gaseous atmosphere comprises a greenhouse gas. In some embodiments, the greenhouse gas comprises carbon dioxide.

In another aspect, which may be combined with any other aspect or embodiment, the present disclosure relates to a battery comprising a cathode comprising a halogenated compound, and an electrolyte comprising an electrolyte additive, wherein the electrolyte additive comprises a heterocyclic compound including at least one nitrogen atom in its ring.

Additional aspects and/or embodiments of the invention will be provided, without limitation, in the detailed description of the present technology set forth below.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
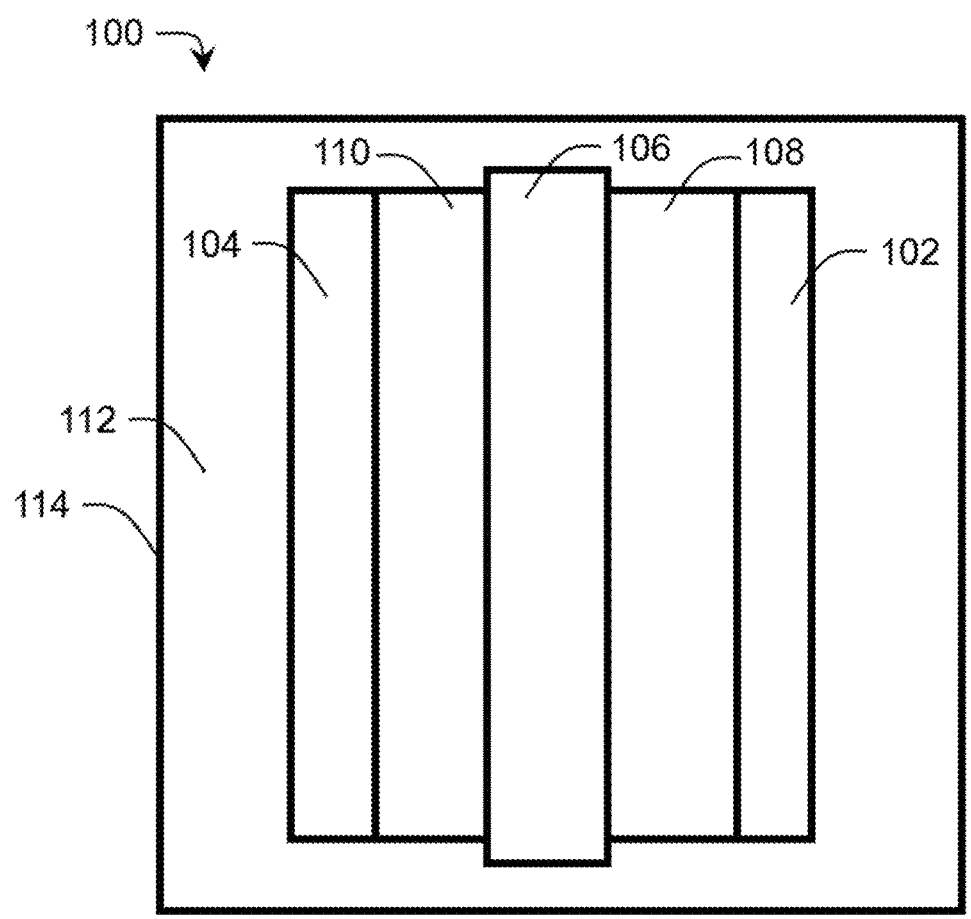
FIG. 1 is a schematic view of a battery according to an exemplary embodiment.

The present application relates to batteries and methods of producing such batteries that address various issues affecting with existing batteries. The batteries described according to the various exemplary (and non-limiting) examples herein provide several advantages. For example, the batteries will have higher energy density, higher power density, longer cycle life, and/or the batteries will exhibit enhanced low temperature performance, when compared to existing batteries.

Reference will now be made in detail to some specific embodiments contemplated by the present disclosure. While various embodiments are described herein, it will be understood that it is not intended to limit the present technology to the described embodiments. On the contrary, it is intended to cover alternatives, modifications, and equivalents as may be included within the spirit and scope of the technology as defined by the appended claims.

In the following description, numerous specific details are set forth in order to provide a thorough understanding of the present technology. Particular exemplary embodiments of the present technology may be implemented without some or all of these specific details. In other instances, well known process operations have not been described in detail in order not to unnecessarily obscure the present technologies.

Various techniques and mechanisms of the present technology will sometimes be described in singular form for clarity. However, it should be noted that some embodiments include multiple iterations of a technique or multiple instantiations of a mechanism unless noted otherwise.

Definitions

As used herein, the term "anode" refers to the negative electrode of a battery cell that transfers electrons to an external circuit through oxidation during discharging, and receives them from an external circuit and is reduced during charging.

As used herein, the term "cathode" refers to the positive electrode of a battery cell that receives electrons from an external circuit and is reduced during discharging, and transfers them to an external circuit through oxidation during charging. In the batteries discussed herein with respect to the various exemplary embodiments, the cathode material includes a halogenated compound and/or an electroactive organic material as defined above.

As used herein, the term "current collector" is used to refer to the component adjacent to the positive and the negative electrode for conveying current from a fixed to a moving portion of the circuit of the battery or vice versa As used herein, the term "electrolyte" refers to a material that provides for ion transport of a battery cell. An electrolyte acts as a conduit for ion transport through its interaction with the anode and the cathode. Upon battery charging, an electrolyte facilitates the movement of ions from the cathode to the anode, whereas upon discharge, the electrolyte facilitates the movement of ions from the anode to the cathode. In rechargeable batteries, the electrolyte promotes ion cycling between the anode and the cathode.

As used herein, the term "full lifecycle of the battery" is intended to mean that the life of the battery is considered to have exceeded its normal useful life, which is assumed here to be the point at which the battery shows 80% of its original capacity for the first time.

As used herein, the term "greenhouse gas" refers to a gas that absorbs and emits radiant energy within the thermal infrared range. A greenhouse gas causes the greenhouse effect, the process by which radiation from a planet's atmosphere warms the planet's surface to a temperature above what it would be without this atmosphere. Some non-exclusive examples include carbon dioxide ($CO_2$), methane ($CH_4$), nitrous oxide ($N_2O$), ozone ($O_3$), tetrafluoromethane ($CF_4$), hexafluoroethane ($C_2F_6$), sulfur hexafluoride ($SF_6$), carbon tetrachloride ($CCl_4$), sulfur hexafluoride ($SF_6$), nitrogen trifluoride ($NF_3$), hydrofluorocarbons, chlorofluorocarbons, perfluorocarbons although there are many additional possibilities, some of which are discussed below.

As used herein, the term "halogenated compound" refers to a compound comprising at least one halogen and at least one metal or at least one oxygen atom. Some non-exclusive examples include $ClO_2$, $LiCl$, and $LiClO_3$ although there are many additional possibilities, some of which are discussed below.

As used herein, the term "heterocyclic compound" refers to a cyclic compound that has atoms of at least two different elements as members of its ring.

As used herein, the term "aliphatic nitrile compound" refers to an open-chain compound comprising at least one nitrile functional group. The aliphatic nitrile compound can be straight or branched, and contain no rings of any type.

As used herein, the term "plasticizer" refers to a material that is added to an organic material to make it softer and more flexible, to increase its plasticity.

As used herein, the term "standard atmospheric pressure" is intended to mean a unit of pressure defined as 101,325 Pa, which is equivalent to 760 mm Hg, 29.9212 inches Hg, 14.696 psi, or 1.013 bar.

Cathode Active Material

Batteries according to the present disclosure comprise a cathode active material. The cathode active material refers to the portion or component of a cathode that participates in electrochemical reactions (e.g., reduction, oxidation) by transporting ions through an electrolyte and/or electrons through an external circuit. The cathode active material may constitute the entirety of the cathode, but is typically only a component of, or a coating on, the cathode. In some embodiments, the cathode active material comprises a sulfide (e.g., metal titanium disulfide, metal polysulfide, $M_2S$, $M_2S_2$, $M_2S_4$, $M_2S_6$, $M_2S_2$, $MV_{0.5}Ti_{0.5}S_2$, where M is a metal), a sulfur containing material (e.g., sulfate, organosulfur), an oxide (e.g., a material of the form $M_xTi_5O_{12}$, $TiO_2$, $TiNb_2O_7$, $Nb_2O_5$, $M_xVO_4$, $H_2Ti_6O_{13}$, $M_xMnBO_3$, $M_xV_2O_5$, $M_xMoO_4$, $M_xW_2O_7$, $M'_{1-x}M''O_2$, $M'_{1-w}(M''_xM'''_y)O_2$, $M_{1-w}(Mn_xNi_y Co_z)O_2$, $M_{1-w}(Mn_xNi_yCo_zAl_w)O_2$, $M_{1-w}(Ni_xCo_yAl_z)O_2$, $M'_{1-w}(Ni_xCo_yM''_z)O_2$, $M'_{1-w}(Ni_xMn_yM''_z)O_2$, $M'M''M'''_2O_4$, $M_xV_yO_z$, $M'M''PO_4$, $M'M''_xM'''_{1-x}PO_4$, where M', M", and M'" may be different metals, metal titanates, metal iron phosphates, metal nickel manganese cobalt oxides, metal nickel cobalt aluminum oxides, metal cobalt oxides, metal nickel oxides, and metal manganese oxides, among others), a halogenated compound, or any combination thereof. In some embodiments, the cathode comprises one or more of an organic material having a conjugated cyclic structure and an electroactive organic material (e.g., truxenone, truxenone derivatives, phenoxazine, phenoxazine derivatives, phenothiazine, phenothiazine, derivatives (e.g., 10-acetylphenothiazine, 10-[2(2-methoxyethoxy)ethyl]-10H-phenothiazine), quinone, quinone derivatives (e.g., 2,2'-(2-vinylanthracene-9,10-diylidene)dimalononitrile, 2-vinylanthraquinone, anthraquinone-2,6-disulfonate, anthraquinone-1,8-disulfonate, anthraquinone-1-sulfonate, anthraquinone-1,5-disulfonic acid, 2,2'-(2-vinylanthracene-9,10-diylidene)bis(1,3-dithiole)), diamine derivatives, phenazine, phenazine derivatives, quinoxaline, quinoxaline derivatives, pyrazine, pyrazine derivatives, cyclohexane, cyclohexane derivatives, triazine, triazine derivatives, melamine, melamine derivatives, dimethoxybenzene, dimethoxybenzene derivatives, cyclopropenium derivatives, amide derivatives, amino acid, amino acid derivatives, viologen, viologen derivatives (e.g., ethylviologen), nitroxide derivatives), an organic radical (e.g., piperidine derivatives (e.g., 4-isothiocyanato-2,2,6,6-tetramethylpiperidine 1-oxyl, 4-oxo-2,2,6,6-tetramethylpiperidine 1-oxyl, 4-(2-iodoacetamido)-2,2,6,6-tetramethylpiperidine 1-oxyl, 4-amino-2,2,6,6-tetramethylpiperidine 1-oxyl, 4-methacryloyloxy-2,2,6,6-tetramethylpiperidine 1-oxyl, 2,2,6,6-tetramethylpiperidine 1-oxyl, 4-acetamido-2,2,6,6-tetramethylpiperidine 1-oxyl, 4-amino-2,2,6,6-tetramethylpiperidine 1-oxyl, 4-(2-chloroacetamido)-2,2,6,6-tetramethylpiperidine 1-oxyl, 2,2,6,6-tetramethyl-4-(2-propynyloxy)piperidine 1-oxyl, 2,2,6,6-tetramethylpiperidine 1-oxyl, 4-carboxy-2,2,6,6-tetramethylpiperidine 1-oxyl, 4-glycidyloxy-2,2,6,6-tetramethylpiperidine 1-oxyl, 4-cyano-2,2,6,6-tetramethylpiperidine 1-oxyl, 4-oxo-2,2,6,6-tetramethylpiperidine 1-oxyl, bis(2,2,6,6-tetramethyl-4-piperidyl-1-oxyl) sebacate, 4-methoxy-2,2,6,6-tetramethylpiperidine 1-oxyl), pyrrolidine derivatives (e.g., 3-carboxy-2,2,5,5-tetramethylpyrrolidine 1-oxyl, 16-DOXYL-stearic acid), imidazoline derivatives (e.g., 2-phenyl-4,4,5,5-tetramethylimidazoline-3-oxide-1-oxyl, 2-(4-nitrophenyl)-4,4,5,5-tetramethylimidazoline-3-oxide-1-oxyl), 1,1-diphenyl-2-picrylhydrazyl, galvinoxyl), and any combination thereof). As used herein, the term "conjugated cyclic structure" is intended to mean a chemical structure of connected p orbitals with delocalized electrons in a molecule in which one or more series of atoms is connected to form a ring.

In some embodiments, the cathode active material comprises a halogenated compound. In some embodiments, the halogenated compound comprises one or more halogen atoms (e.g., F, Cl, Br, or I). In some embodiments the halogenated compound comprises one or more metal atoms (e.g., alkaline earth metal, transition metal, rare earth metal, post-transition metal, alkali metal, amphoteric metal or any combination thereof). In some embodiments, the halogenated compound has a chemical formula of $M_aC_bH_cO_dA_x$, wherein M is a metal, C is a carbon atom, H is a hydrogen atom, O is an oxygen atom, A is a halogen atom, a, b, c, and d are independently non-negative real numbers, and x is a positive nonzero real number. In some embodiments, the halogenated compound has a chemical formula of $M_xC_aH_bO_cA_y$, wherein M is a metal, C is a carbon atom, H is a hydrogen atom, O is an oxygen atom, A is a halogen atom, a, b, and c are independently non-negative real numbers, and x and y are independently positive nonzero real numbers. In some embodiments, the halogenated compound has a chemical formula of $M_aC_bH_cO_xA_y$, wherein M is a metal, C is a carbon atom, H is a hydrogen atom, O is an oxygen atom, A is a halogen atom, a, b, and c are independently non-negative real numbers, and x and y are independently positive nonzero real numbers. In some embodiments, the halogenated compound has a chemical formula of $M_xM'_aP_bC_cH_dO_eA_y$, wherein M is a metal, M' is another metal, P is a phosphorous atom, C is a carbon atom, H is a hydrogen atom, O is an oxygen atom, A is a halogen atom, a, b, c, d, and e are independently non-negative real numbers, and x and y are independently positive nonzero real numbers. In some embodiments, the halogenated compound has a chemical formula of $M_xA_y$, wherein M is a metal, A is a halogen atom, and x and y are independently positive nonzero real numbers. In some embodiments, the metal comprises atoms of one or more of lithium, sodium, potassium, beryllium, magnesium, calcium, vanadium, iron, nickel, copper, zinc, and aluminum, and ions thereof. In some embodiments, the halogenated compound comprises, by way of non-limiting example, LiCl, LiClO, $LiClO_3$, $LiClO_4$, $Li_3ClO$, $Li_{17}Cl_5O_6$, $LiClO_2$, $Li_5Cl_3O$, $LiCl_2O_4$, $LiClO_7$, LiBr, $Li_3BrO$, $Li_7Br_3O_2$, $Li_2BrO$, $Li_5Br_3O_2$, $LiBrO_3$, LiBrO, LiI, $LiIO_3$, $Li_5IO_6$, $LiIO_4$, $Li_2IO_6$, $LiIO_5$, LiF, $LiC_4OF_9$, $LiH_8C_4O_5F_9$, $Li_2H_{10}C_8O_7F_{18}$, $LiH_{20}C_8ClO_4$, $LiH_{20}C_8BrO_4$, $LiH_2ClO_5$, $Li_4H_3ClO_3$, $LiH_6ClO_7$, $LiH_2ClO$, $LiH_6BrO_7$, $LiH_2BrO$, $Li_4H_3BrO_3$, $LiH_2BrO_5$, $LiH_2IO$, $Li_2IHIO$, $LiH_2IO$, $LiH_6IO_7$, $C_4O_5F_6$, $C_2O_3F_2$, $C_2O_3F_6$, $C_{68}OF_{20}$, $C_3OF_2$, $ClO_2$, $Cl_2O_7$, $ClO_3$, $Cl_2O$, ClO, $Cl_2O_4$, $Cl_2O_6$, $ClO_6$, $ClO_5$, $CCl_2O$, $C_6Cl_4O_2$, $C_8C_{14}O_3$, $C_{20}C_{118}O$, $C_3C_{12}O$, $H_5C_2ClO$, $C_9H_{11}Cl_7$, BrCl, $Br_2O_3$, $Br_2O$, $BrO_3$, $BrO_4$, $BrO_2$, BrO, $C_3Br_2O$, $I_2O_5$, $IO_2$, $IO_3$, $I_3O_8$, $C_2IO$, $CuF_2$, $LiNi_aCo_bMn_cAl_dO_{2-x}Cl_x$, $LiNi_aCo_bMn_cAl_dO_{2-x}F_x$, $LiNi_aCo_bMn_cAl_dO_{4-x}Cl_x$, $LiNi_aCo_bMn_cAl_dO_{4-x}F_x$, $LiCoO_xF_y$, $LiCoO_xCl_y$, $LiFePO_{4-x}F_x$, $LiFePO_{4-x}Cl_x$, or any combination thereof, where a, b, c, and d are independently non-negative real numbers, and x and y are independently positive nonzero real numbers. In some embodiments, the halogenated compound has one or more of organic moieties, where an organic moiety comprises one or more of carbon and hydrogen and is a fragment or substituent of a larger material. In some embodiments, the organic moiety is derived from an appropriate organic material or organic compound. In some embodiments, the organic moieties comprise, by way of non-limiting examples, alkyl groups, alkenyl groups, alkynyl groups, acyl groups, alkylamino groups, aryl groups, aromatic groups or any combinations thereof. In some embodiments, the organic moiety comprises a heteroatom, such as boron, oxygen, nitrogen, sulfur, phosphorous, fluorine, chlorine, bromine, nitrogen, oxygen, or any combinations thereof. In some embodiments, the halogenated compound comprises an organic moiety that includes one or more aromatic groups. As used herein, the term "aromatic group" is intended to mean a functional group that contain one or more rings with pi electrons delocalized all the way around them.

Cathode Current Collector

In some embodiments, a battery according to the present disclosure comprises a cathode current collector. In some embodiments, the cathode current collector comprises one or more metals (e.g., alkaline earth metal, transition metal, rare earth metal, post-transition metal, alkali metal, or any combination thereof). In some embodiments, the cathode current collector comprises at least one of aluminum, a form of aluminum, aluminum alloy, nickel, a form of nickel, nickel alloy, duplex steel, stainless steel or any combination thereof. In some embodiments, the cathode current collector comprises a metal alloy having at least one material selected from the group consisting of molybdenum, titanium, zirconium, and combinations thereof.

In some embodiments, the cathode current collector is in contact with (e.g., coated with) a halogenated compound and/or an electrically-conductive material. In some embodiments, the electrically conductive material as part of the cathode is a porous carbon material comprising, consisting essentially of, or is selected from the group consisting of carbon black, carbon nanotubes, carbon nanofibers, carbon dots, activated carbon, amorphous carbon, microporous carbon, mesoporous carbon, macroporous carbon, graphite, graphene, graphene oxide, reduced graphene oxide, graphene nanoribbons, and combinations thereof. In some embodiments, the porous carbon material is doped with one or more heteroatoms selected from the group consisting of boron, oxygen, nitrogen, sulfur, phosphorous, fluorine, chlorine, bromine, and combinations thereof. In some embodiments, the electrically-conductive material is in the form of particles, powders, paper, foam, fibers, sheets, discs, rods, foils, or any combination thereof.

In some embodiments, the electrically conductive material comprises a porous carbon material. In some embodiments, the porous carbon material comprises particles with an average particle size (diameter) of 50 nm to 50 µm, though the particle size is not particularly limited. In some embodiments, the average particle size is at least 50 nm, at least 55 nm, at least 60 nm, at least 65 nm, at least 70 nm, at least 75 nm, at least 80 nm, at least 85 nm, at least 90 nm, at least 95 nm, at least 100 nm, at least 110 nm, at least 120 nm, at least 130 nm, at least 140 nm, at least 150 nm, at least 200 nm, at least 250 nm, at least 300 nm, at least 350 nm, at least 400 nm, at least 450 nm, at least 500 nm, at least 550 nm, at least 600 nm, at least 650 nm, at least 700 nm, at least 750 nm, at least 800 nm, at least 850 nm, at least 900 nm, at least 950 nm, at least 1 µm, at least 2 µm, at least 3 µm, at least 4 µm, at least 5 µm, at least 10 µm, at least 20 µm, at least 30 µm, at least 40 µm, at least 50 µm, or any range or value therein.

In some embodiments, the porous carbon material comprises particles with an average particle size (diameter) no greater than 50 µm, no greater than 40 µm, no greater than 30 µm, no greater than 20 µm, no greater than 10 µm, no greater than 5 µm, no greater than 4 µm, no greater than 3 µm, no greater than 2 µm, no greater than 1 µm, no greater than 950 nm, no greater than 900 nm, no greater than 850 nm, no greater than 800 nm, no greater than 750 nm, no greater than 700 nm, no greater than 650 nm, no greater than 600 nm, no greater than 550 nm, no greater than 500 nm, no greater than 450 nm, no greater than 400 nm, no greater than 350 nm, no greater than 300 nm, no greater than 250 nm, no greater than 200 nm, no greater than 150 nm, no greater than 100 nm, no greater than 95 nm, no greater than 90 nm, no greater than 85 nm, no greater than 80 nm, no greater than 75 nm, no greater than 70 nm, no greater than 65 nm, no greater than 60 nm, no greater than 55 nm, no greater than 50 nm, or any range or value therein.

The pore size of the porous carbon material is not particularly limited. In some embodiments, the porous carbon material may have a pore size of 0.1 nm to 1 µm. In some embodiments, the pore size is at least 0.1 nm, at least 0.2 nm, at least 0.3 nm, at least 0.4 nm, at least 0.5 nm, at least 0.6 nm, at least 0.7 nm, at least 0.8 nm, at least 0.9 nm, at least 1 nm, at least 2 nm, at least 3 nm, at least 4 nm, at least 5 nm, at least 6 nm, at least 7 nm, at least 8 nm, at least 9 nm, at least 10 nm, at least 20 nm, at least 30 nm, at least 40 nm, at least 50 nm, at least 60 nm, at least 70 nm, at least 80 nm, at least 90 nm, at least 100 nm, at least 150 nm, at least 200 nm, at least 250 nm, at least 300 nm, at least 350 nm, at least 400 nm, at least 450 nm, at least 500 nm, at least 550 nm, at least 600 nm, at least 650 nm, at least 700 nm, at least 750 nm, at least 800 nm, at least 850 nm, at least 900 nm, or at least 950 nm, at least 1 µm, at least 2 µm, at least 3 µm, at least 4 µm, at least 5 µm, at least 6 µm, at least 7 µm, at least 8 µm, at least 9 µm, at least 10 µm, or any range or value therein.

In some embodiments, the pore size is no greater than 10 µm, no greater than 9 µm, no greater than 8 µm, no greater than 7 µm, no greater than 6 µm, no greater than 5 µm, no greater than 4 µm, no greater than 3 µm, no greater than 2 µm, no greater than 1 µm, no greater than 950 nm, no greater than 900 nm, no greater than 850 nm, no greater than 800 nm, no greater than 750 nm, no greater than 700 nm, no greater than 650 nm, no greater than 600 nm, no greater than 550 nm, no greater than 500 nm, no greater than 450 nm, no greater than 400 nm, no greater than 300 nm, no greater than 250 nm, no greater than 200 nm, no greater than 150 nm, no greater than 100 nm, no greater than 90 nm, no greater than 80 nm, no greater than 70 nm, no greater than 60 nm, no greater than 50 nm, no greater than 40 nm, no greater than 30 nm, no greater than 20 nm, no greater than 10 nm, no greater than 9 nm, no greater than 8 nm, no greater than 7 nm, no greater than 6 nm, no greater than 5 nm, no greater than 4 nm, no greater than 3 nm, no greater than 2 nm, no greater than 1 nm, no greater than 0.9 nm, no greater than 0.8 nm, no greater than 0.7 nm, no greater than 0.6 nm, no greater than 0.5 nm, no greater than 0.4 nm, no greater than 0.3 nm, no greater than 0.2 nm, or any range or value therein.

In some embodiments, the current collector is perforated, wherein the pore size is not particularly limited. In some embodiments, the pore size is at least 500 nm, at least 550 nm, at least 600 nm, at least 650 nm, at least 700 nm, at least 750 nm, at least 800 nm, at least 850 nm, at least 900 nm, at least 950 nm, at least 1 µm, at least 2 µm, at least 3 µm, at least 4 µm, at least 5 µm, at least 10 µm, at least 20 µm, at least 30 µm, at least 40 µm, at least 50 µm, at least 60 µm, at least 70 µm, at least 80 µm, at least 90 µm, at least 100 µm, at least 150 µm, at least 200 µm, at least 250 µm, at least 300 µm, at least 350 µm, at least 400 µm, at least 450 µm, at least 500 µm, at least 550 µm, at least 600 µm, at least 650 µm, at least 700 µm, at least 750 µm, at least 800 µm, at least 850 µm, at least 900 µm, at least 950 µm, at least 1 mm, or any range or value therein.

The distance between pores is not particularly limited. In some embodiments the distance between pores is at least 10 µm, at least 15 µm, at least 20 µm, at least 25 µm, at least 30 µm, at least 35 µm, at least 40 µm, at least 45 µm, at least 50 µm, at least 55 µm, at least 60 µm, at least 65 µm, at least 70 µm, at least 75 µm, at least 80 µm, at least 85 µm, at least 90 µm, at least 95 µm, at least 100 µm, at least 150 µm, at least 200 µm, at least 250 µm, at least 300 µm, at least 350 µm, at least 400 µm, at least 450 µm, at least 500 µm, at least 550 µm, at least 600 µm, at least 650 µm, at least 700 µm, at least 750 µm, at least 800 µm, at least 850 µm, at least 900 µm, at least 950 µm, at least 1 mm, at least 2 mm, at least 3 mm, at least 4 mm, at least 5 mm, at least 6 mm, at least 7 mm, at least 8 mm, at least 9 mm, at least 10 mm, at least 15 mm, at least 20 mm, at least 25 mm, at least 30 mm, at least 35 mm, at least 40 mm, at least 45 mm, at least 50 mm, at least 55 mm, at least 60 mm, at least 65 mm, at least 70 mm, at least 75 mm, at least 80 mm, at least 85 mm, at least 90 mm, at least 95 mm, at least 100 mm, or any range or value therein.

Electrolyte

In some embodiments, a battery according to the present disclosure comprises an electrolyte. In some embodiments, the electrolyte comprises an electrolytic solvent, wherein the electrolytic solvent is between the cathode and the anode and in contact with the cathode and the anode. In some embodiments, the electrolyte comprises a solid electrolyte (e.g., polymers, glass, phosphates, fluorophosphates, carbonates, amines, borates, fluoroborates, halides, halates, oxohalides, oxides (e.g., $MO_2$, $M_2O_3$, $M_2B_2O_5$, $M_2O$, MOH, $M_2O_2$, $M_2CO_3$, $P_2O_5$, $MPO_4$, $M_2M'O_7$, wherein M is a metal or metalloid), perovskites, antiperovskites (e.g., $M_3OBr$, $M_0OCl$, $M_2OHBr$, $M_2OHCl$, wherein M is a metal or metalloid), LISICON-type electrolytes (e.g., $M_{1+x}M'_xM''_{2-x}(PO_4)_3$, $M_{2+2x}M'_{1-x}M''O_4$, $M_{(3+x)}M'_xV_{(1-x)}O_4$, $M_{(4-x)}M'_{(1-x)}P_xO_4$, $M_{1+x+y}M'_xM'_{2-y}Si_yP_{3-y}O_{12}$, $M_{1+x}M'_xM''_yTi_{2-x-y}P_3O_{12}$, $M_{1+x+3y}M'_xM''_{2-x}(Si_yPO_4)_3$, $M_{14}M'M''_4O_{16}$, $M_{4-x}M'_xV_xO_4$, wherein M is metal or metalloid), garnets (e.g., $M_7M'_3M''_2O_{12}$, $M_{7-x}M'_3M''_{2-x}Nb_xO_{12}$, $M_7M'_{3-x}M''_xZr_{2-x}Nb_xO_{12}$, $M_{6+x}M'_3M'''_{1+x}Ta_{1-x}O_{12}$, wherein M is a metal or metalloid), sulfides (e.g., $M_6PS_5Cl$, $M_{9.54}M'_{1.74}P_{1.44}S_{11.7}Cl_{0.3}$, $M_{10}M'P_2S_{12}$, $M_7PS_6$, $M_7P_3S_{11}$, $M_{3.25}P_{0.95}S_4$, $M_{3+x}M'_xP_{1-x}S_4$, wherein M is a metal or metalloid), thio-LISICON type electrolytes (e.g., $M_{(4-x)}M'_{(1-x)}P_xS_4$, wherein M is a metal or metalloid), oxynitrides, nitrides, or the like), liquid electrolyte, a liquefied gas electrolyte (e.g., methane (e.g., methane, fluoromethane, difluoromethane), an ethane (e.g., ethane, fluoroethane, 1,1-difluoroethane, 1,1,1,2-tetrafluoroethane), a propane (e.g., propane, 2-fluoropropane), a butane (e.g., butane, fluorobutane), an ethylene, an acetylene, a propylene), or any combination thereof. In some embodiments, the electrolyte comprises an aqueous electrolyte. In some embodiments, the electrolyte comprises at least one aliphatic nitrile compound. In some embodiments, the aliphatic nitrile compound comprises, by way of non-limiting example, 3-methoxypropionitrile (MPN), methoxyacetonitrile (MAN), acetonitrile (AN), valeronitrile (VN), succinonitrile, glutaronitrile, adiponitrile, acrylonitrile, propionitrile, tolunitrile, methoxybenzonitrile, malononitrile, tetracyanoethylene, 3,3'-oxydipropionitrile, 3-ethoxypropionitrile, 1,3,6-hexanetricarbonitrile, 1,2,2,3-propanetetracarbonitrile, malononitrile, fumaronitrile, or 3-butoxypropionitrile or any combination thereof.

In some embodiments, the electrolyte comprises a heterocyclic compound with at least one nitrogen atom in its ring. In some embodiments, the electrolyte comprises pyridine, imidazole, 1,2,3,6-tetrahydropyridine, piperidine, methylpyridine, aminopyridine, ethynylpyridine, vinylpyridine, dimethylpyridine, ethylpyridine, lutidine, 4-tert-butylpyridine (TBP), 2,2'-bipyridine (BPY), 1-methylimidazole (MI), 1-methylbenzimidazole (MIB), 1-(trimethylsilyl)imidazole), methylimidazoline, vinylimidazole, dimethylimidazole, mercaptoimidazole, histamine, nitroimidazole, ethylpiperazine, methimazole, thiamazole, 2-mercapto-1-methylimidazole, dicyanoimidazole, or any combination thereof.

In some embodiments, the electrolyte comprises at least one, preferably at least two, or more preferably at least three carbonate compounds. In some embodiments, the carbonate compounds comprise ethylene carbonate (EC), diethyl carbonate (DEC), dimethyl carbonate (DMC), ethyl methyl carbonate (EMC), propylene carbonate (PC), dipropyl carbonate (DPC), fluoroethylene carbonate (FEC), vinylene carbonate, 4-vinyl-1,3-dioxolan-2-one, 4-chloro-1,3-dioxolan-2-one, diethyl 2,5-dioxahexanedioate, bis(2,2,2-trifluoroethyl) carbonate, 4-fluoro-1,3-dioxolan-2-one, dimethyl 2,5-dioxahexanedioate, dibutyl carbonate, among others or any combination thereof. In some embodiments, the electrolyte comprises at least one ether compound. In some embodiments, the ether compounds comprise, by way of non-limiting example, dime thoxyethane, dimethoxymethane, dimethyl ether, diethyl ether, ethylene glycol, ethylene glycol derivatives (diglyme, triglyme, tetraglyme), tetrahydrofuran, dioxolane, dioxane, or any combinations thereof. In some embodiments, the electrolyte comprises at least one amide compound. In some embodiments, the amide compounds comprise, by way of non-limiting example, dimethylformamide, dimethylacetamide, dipropylacetamide, among others, or any combinations thereof. In some embodiments, the electrolyte comprises at least one ester compound. In some embodiments, the ester compounds comprise, by way of non-limiting example, triethyl borate, trimethyl borate, tris(2,2,2-trifluoroethyl) borate, 2,4,6-trimethoxyboroxin, tributyl borate, trihexyl borate, tripropyl borate, or any combinations thereof. In some embodiments, the electrolyte comprises at least one ionic liquid. In some embodiments, the ionic liquids comprise, by way of non-limiting example, an imidazolium derivative (such as, for example, 1-ethyl-3-methylimidazolium hexafluorophosphate, 1-ethyl-3-methylimidazolium tetrafluoroborate, 1-ethyl-2,3-dimethylimidazolium bis(trifluoro-methanesulfonyl)imide, 1-ethyl-3-methylimidazolium bis(trifluoromethanesulfonyl)imide, 2,3-dimethyl-1-propylimidazolium bis(trifluoro-methanesulfonyl)imide, 1-decyl-3-methyl-imidazolium tetrafluoroborate, 1-decyl-3-methylimidazolium bis(trifluoro-methanesulfonyl)imide, 1,3-dimethylimidazolium bis(trifluoromethanesulfonyl)imide, 1-dodecyl-3-methylimidazolium bis(trifluoro-methanesulfonyl)imide, 1-ethyl-3-methyl-imidazolium nitrate, 1-ethyl-3-methyl-imidazolium trifluoromethanesulfonate, 1-vinylimidazole bis(trifluoro-methanesulfonyl)imide, 1-allyl-3-methylimidazolium bis(trifluoromethanesulfonyl)imide, 1-methyl-3-n-octylimidazolium trifluoro-methanesulfonate, 3-ethyl-1-vinylimidazolium bis(trifluoromethanesulfonyl)imide, 1-methyl-3-n-octylimidazolium tetrafluoroborate, 1-butyl-2,3-dimethylimidazolium tetrafluoro-borate, 1-butyl-2,3-dimethylimidazolium hexafluorophosphate, 1-butyl-3-methyl-imidazolium tetrafluoroborate, 1-butyl-3-methylimidazolium methanesulfonate, 1-butyl-3-methylimidazolium bis(trifluoromethanesulfonyl)imide, 1-butyl-3-methyl-imidazolium hexafluorophosphate, 1-butyl-2,3-dimethylimidazolium trifluoro-methanesulfonate, 1-ethyl-3-methylimidazolium methane-sulfonate, 1-butyl-3-methylimidazolium trifluoromethanesulfonate, 1-butyl-2,3-dimethyl-imidazolium bis(trifluoromethane-sulfonyl)imide, 1-methyl-3-(4-sulfobutyl)imidazolium bis(tri-fluoromethanesulfonyl)imide, 1-methylimidazole bis(trifluoromethanesulfonyl)imide, 1-methyl-1H-imidazol-3-ium hexafluorophosphate, 3,3'-(butane-1,4-diyl)bis(1-vinyl-3-imidazolium) bis(trifluoromethanesulfonyl)imide), a pyrrolidinium derivative, (such as, for example, 1-butyl-1-methylpyrrolidinium trifluoromethanesulfonate, 1-butyl-1-methylpyrrolidinium hexafluorophosphate, 1-methyl-1-pentylpyrrolidinium bis(trifluoromethanesulfonyl)imide, 1-methyl-1-propylpyrrolidinium, bis(trifluoromethanesulfonyl)imide, 1-butyl-1-methylpyrrolidinium bis(trifluoromethanesulfonyl) imide, 1-ethyl-1-methylpyrrolidinium tetrafluoroborate, or 1-allyl-1-methylpyrrolidinium bis(trifluoromethanesulfonyl)imide, among others), a pyridinium derivative (such as, for example, 1-butyl-4-methylpyridinium hexafluorophosphate, 1-butyl-4-methylpyridinium bis(trifluoro-methanesulfonyl)imide, 1-hexylpyridinium hexafluorophosphate, 1-ethyl-3-(hydroxymethyl)pyridinium ethyl sulfate, 1-butylpyridinium tetrafluoroborate, 1-butylpyridinium hexafluorophosphate, 1-butyl-4-methylpyridinium hexafluorophosphate, 1-butylpyridinium tetrafluoroborate, 1-butylpyridinium hexafluorophosphate, 1-butyl-4-methylpyridinium tetrafluoroborate, 1-ethyl-3-methylpyridinium bis(trifluoro-methanesulfonyl)imide, 1-ethyl-3-methylpyridinium ethyl sulfate, 1-methylpyridinium bis(trifluoromethanesulfonyl)imide, or 1,1'-bis[3-(trimethylammonio)propyl]-4,4'-bipyridinium, among others), a piperidinium derivative such as, for example, 1-butyl-1-methylpiperidinium bis(trifluoromethanesulfonyl)imide, or 1-methyl-1-propylpiperidinium bis(fluorosulfonyl)-imide, an ammonium derivative such as, for example, methyltri-n-octylammonium bis(trifluoromethane sulfonyl)imide, ethyl (3-methoxypropyl)dimethylammonium bi s(trifluoromethanesulfonyl)imide, ethyl(2-methoxyethyl) dimethylammonium bis(trifluoromethane-sulfonyl)imide, butyltrimethyl ammonium bis(trifluoromethan-esulfonyl) imide, tetrabutyl-ammonium trifluoromethanesulfonate, methyltri-n-octylammonium bis(trifluoro-methane-sulfonyl)imide, trimethyl-propylammonium bis(trifluoromethanesulfonyl)imide, tributyl-methylammonium bis(trifluoromethane sulfonyl)imide, butyltrimethylammonium bis(trifluoro-methanesulfonyl)imide, or tetrabutyl ammonium hexafluorophosphate, a phosphonium derivative such as, for example tributylmethylphosphonium bis(trifluoromethanesulfonyl)imide, tributyl(2-methoxyethyl)-phosphonium bis(trifluoromethane-sulfonyl)imide, tetrabutylphosphonium tetrafluoroborate, tetrabutyl-phosphonium hexafluorophosphate, or tributylmethyl-phosphonium bis(trifluoromethanesulfonyl)imide, a morpholinium derivative, or a sulfonium derivative (such as, for example, triethylsulfonium bis(trifluoromethanesulfonyl)imide)) or any combinations thereof.

In some embodiments, the electrolytic solvent is in contact with the cathode active material. In some embodiments, the electrolytic solvent is in contact with the cathode active material, and is located in the cathode (e.g., in between particles constituting the cathode active material). In some embodiments, the halogenated compound is soluble in the electrolytic solvent. In some embodiments, the halogenated compound has a solubility of greater than 1 mmol/L in the electrolytic solvent at room temperature. Preferably, the halogenated compound has a solubility of greater than 10 mmol/L in the electrolytic solvent at room temperature. More preferably, the halogenated compound has a solubility of greater than 100 mmol/L in the electrolytic solvent at room temperature.

Electrolyte Additive

In some embodiments, a battery according to the present disclosure includes an electrolyte additive. In some embodiments, the electrolyte additive comprises phosphazenes, phosphates, sulfonyls, carboxylic acids, or any combinations thereof. In some embodiments, the electrolyte additive comprises a heterocyclic compound with a nitrogen atom in its ring. In some embodiments, the electrolyte comprises, by way of non-limiting example, pyridine, imidazole, 1,2,3,6-tetrahydropyridine, piperidine, methylpyridine, aminopyridine, ethynylpyridine, vinylpyridine, dimethylpyridine, ethylpyridine, lutidine, 4-tert-butylpyridine (TBP), 2,2'-bipyridine (BPY), 1-methylimidazole (MI), 1-methylbenzimidazole (MIB), 1-(trimethylsilyl) imidazole), methylimidazoline, vinylimidazole, dimethylimidazole, mercaptoimidazole, histamine, nitroimidazole, ethylpiperazine, methimazole, thiamazole, 2-mercapto-1-methylimidazole, dicyanoimidazole, or any combination thereof.

Anode

In some embodiments, a battery according to the present disclosure comprises an anode comprising an anode active material. The anode active material refers to the portion or component of an anode that participates in electrochemical reactions (e.g., reduction, oxidation) by transporting ions through an electrolyte and/or electrons through an external circuit. The anode active material may constitute the entirety of the anode, but is typically only a component of, or a coating on, the anode. The selection of anode active material is not particularly restricted provided that the selected material can store and release ions. For example, the anode active material can be an alkali metal (such as lithium, sodium, and/or potassium), an alkaline earth metal (such as, magnesium and/or calcium), an amphoteric metal (such as aluminum and/or zinc), a metalloid (such as boron, germanium, arsenic, antimony, tin, tellurium, polonium, and/or silicon), a metal complex, an inorganic carbon (such as graphite, graphene, graphene oxide, reduced graphene oxide, activated carbon, carbon nanotubes, and/or carbon dots), sulfur, a sulfide (such a metal titanium disulfide $MV_{0.5}Ti_{0.5}S_2$, where M is a metal, metal sulfide ($M_2S$), metal polysulfide (e.g., $M_2S_2$, $M_2S_4$, $M_2S_6$, $M_2S_8$)), a sulfur-containing compound or material (such as a sulfate or organosulfur compound (e.g., poly(sulfur-random-(1,3-diisopropenylbenzene)), sulfurized polyacrylonitrile)), an oxide (e.g., a material of the form $M_xTi_5O_{12}$, $TiO_2$, $TiNb_2O_7$, $Nb_2O_5$, $M_xVO_4$, $H_2Ti_6O_{13}$, $M_xMnBO_3$, $M_xV_2O_5$, $M_xMoO_4$, $M_xW_2O_7$, $M'_{1-x}M''O_2$, $M'_{1-w}(M''_xM'''_y)O_2$, and/or metal titanate), an organic material or compound (e.g., truxenone, truxenone derivatives, phenoxazine, phenoxazine derivatives, phenothiazine, phenothiazine derivatives (e.g., 10-acetylphenothiazine, 10-[2-(2-methoxyethoxy)ethyl]-10H-phenothiazine), quinone, quinone derivatives (e.g., 2,2'-(2-vinylanthracene-9,10-diylidene)dimalononitrile, 2-vinylanthraquinone, anthraquinone-2,6-disulfonate, anthraquinone-1,8-disulfonate, anthraquinone-1-sulfonate, anthraquinone-1,5-disulfonic acid, 2,2'-(2-vinylanthracene-9,10-diylidene)bis(1,3-dithiole)), diamine derivatives, phenazine, phenazine derivatives, quinoxaline, quinoxaline derivatives, pyrazine, pyrazine derivatives, cyclohexane, cyclohexane derivatives, triazine, triazine derivatives, melamine, melamine derivatives, dimethoxybenzene, dimethoxybenzene derivatives, cyclopropenium derivatives, amide derivatives, amino acid, amino acid derivatives, viologen, viologen derivatives (e.g., ethylviologen), nitroxide derivatives), an organic radical (e.g., piperidine derivatives (e.g., 4-isothiocyanato-2,2,6,6-tetramethylpiperidine 1-oxyl, 4-oxo-2,2,6,6-tetramethylpiperidine 1-oxyl, 4-(2-iodoacetamido)-2,2,6,6-tetramethylpiperidine 1-oxyl, 4-amino-2,2,6,6-tetramethylpiperidine 1-oxyl, 4-methacryloyloxy-2,2,6,6-tetramethylpiperidine 1-oxyl, 2,2,6,6-tetramethylpiperidine 1-oxyl, 4-acetamido-2,2,6,6-tetramethylpiperidine 1-oxyl, 4-amino-2,2,6,6-tetramethylpiperidine 1-oxyl, 4-(2-chloroacetamido)-2,2,6,6-tetramethylpiperidine 1-oxyl, 2,2,6,6-tetramethyl-4-(2-propynyloxy)piperidine 1-oxyl, 2,2,6,6-tetramethylpiperidine 1-oxyl, 4-carboxy-2,2,6,6-tetramethylpiperidine 1-oxyl, 4-glycidyloxy-2,2,6,6-tetramethylpiperidine 1-oxyl, 4-cyano-2,2,6,6-tetramethylpiperidine 1-oxyl, 4-oxo-2,2,6,6-tetramethylpiperidine 1-oxyl, bis(2,2,6,6-tetramethyl-4-piperidyl-1-oxyl) sebacate, 4-methoxy-2,2,6,6-tetramethylpiperidine 1-oxyl), pyrrolidine derivatives (e.g., 3-carboxy-2,2,5,5-tetramethylpyrrolidine 1-oxyl, 16-DOXYL-stearic acid), imidazoline derivatives (e.g., 2-phenyl-4,4,5,5-tetramethylimidazoline-3-oxide-1-oxyl, 2-(4-nitrophenyl)-4,4,5,5-tetramethylimidazoline-3-oxide-1-oxyl), 1,1-diphenyl-2-picrylhydrazyl, galvinoxyl) or any combination thereof. In some embodiments, the anode active material comprises a silicon atom. In some embodiments, the anode comprises a non-metal oxide as an anode active material. In some embodiments, the anode comprises a metal oxide. In some embodiments, the metal oxide comprises one or more of titanium, niobium, and vanadium. In some embodiments, the anode comprises, by way of non-limiting example, a metal oxide such as $Li_4Ti_5O_{12}$, $TiO_2$, $TiNb_2O_7$, $Nb_2O_5$, $Li_3VO_4$, $H_2Ti_6O_{13}$, $LiMnBO_3$, $LiV_{0.5}Ti_{0.5}S_2$, $Li_3V_2O_5$, $Li_{3+x}V_2O_5$, $Li_3MoO_4$, $Li_5W_2O_7$, or any combination thereof.

In some embodiments, a battery according to the present disclosure does not comprise an anode.

Anode Current Collector

In some embodiments, a battery according to the present disclosure comprises an anode current collector in contact with an anode. In some embodiments the anode current collector is in contact with the anode, such that the anode is between the anode current collector and the electrolyte. In some embodiments, the anode current collector comprises a metal or metal alloy. In some embodiments the anode current collector comprises, by way of non-limiting example, copper, a form of copper, a copper alloy, nickel, a form of nickel, a nickel alloy, duplex steel, stainless steel, silver, a form of silver, a silver alloy, or any combination thereof.

In some embodiments, a battery according to the present disclosure comprises an anode current collector but does not comprise an anode. In such embodiments, the anode current collector is disposed on the electrolyte such that the electrolyte is between the cathode and the anode current collector. In some embodiments, the anode current collector is the exterior housing (or casing) of the battery.

Separator

In some embodiments, a battery according to the present disclosure comprises a separator. In some embodiments, the separator is between the cathode and the anode. In some embodiments, the separator is in contact with the electrolyte. In some embodiments, the separator is between the anode current collector and the cathode (e.g., when the battery does not comprise an anode). In some embodiments, the separator comprises a polymer film (e.g., polyethylene, polypropylene, poly(tetrafluoroethylene), poly (vinyl chloride), etc.) nonwoven fibers (e.g., nylon, polyesters, glass, etc.), a glass, a ceramic, or any combination thereof. In some embodiments, the separator comprises glass fiber. In some embodiments, the separator comprises a surfactant coating or treatment therein or thereon to enhance wettability of a liquid-based electrolyte.

Plasticizer/Carboxylic Acid

In some embodiments, a battery according to the present disclosure comprises one or both of a plasticizer and a carboxylic acid in the electrolyte and/or the electrode (anode, cathode) materials. In some embodiments, the plasticizer comprises, by way of non-limiting example, succinonitrile, glutaronitrile, adiponitrile, ethylene carbonate, propylene carbonate, dimethylformamide, dimethyl sulfoxide, γ-butyrolactone, sulfolane, 3-methyl-2-oxazolidinone, butylene carbonate, phthalate derivatives, trimellitates, adipates, sebacates, maleates, or any combination thereof. In some embodiments, the plasticizer comprises succinonitrile (SN). In some embodiemtns, the carboxylic acid may be present to facilitate ion transport in and out of cathode active material. When present, the carboxylic acid can be a monocarboxylic acid or a polycarboxylic acid. When the carboxylic acid is a polycarboxylic acid, it may be oxalic acid.

Polymer Additives

In some embodiments, a battery according to the present disclosure comprises a polymeric compound in the electrolyte and/or the electrode (anode, cathode) materials. In some embodiments, the one or more polymer additives comprise(s), by way of non-limiting example, polycaprolactone, poly(acrylic acid), poly(methyl methacrylate), polytetrafluoroethylene, poly(vinylidene fluoride), polyacrylonitrile, poly(ethylene terephthalate), polyvinylpyrrolidone, poly(4-vinylpyridine), polyvinyl chloride, polyvinyl alcohol, polyvinyl acetate, polyethylene, polypropylene, polylactic acid, polyvinyl butyral, polystyrene, polyurethane, polycarbonate, or any combination thereof. In some embodiments, the polymeric compound comprises poly (ethylene oxide) ("PEO").

Greenhouse Gas Atmosphere

In some embodiments, a battery includes greenhouse gas within the battery. In some embodiments, the battery is fabricated under a greenhouse gas atmosphere, or the greenhouse gas is introduced into the battery before use. In some embodiments, the electrolyte and/or electrode (anode, cathode) materials are in contact with the greenhouse gas. In some embodiments, the greenhouse gas comprises, by way of non-limiting example, carbon dioxide ($CO_2$), carbon monoxide (CO), ozone ($O_3$), methane ($CH_4$), tetrafluoromethane ($CF_4$), hexafluoroethane ($C_2F_6$), sulfur hexafluoride ($SF_6$), carbon tetrachloride ($CCl_4$), nitrous oxide ($N_2O$), sulfur dioxide ($SO_2$), carbon disulfide ($CS_2$), and carbonyl sulfide (COS), one or more perfluorocarbons, one or more chlorofluorocarbons, one or more hydrofluorocarbons, or any combination thereof.

In some embodiments, the greenhouse gas is not intended to be used as an active material. In some embodiments, the greenhouse gas is consumed or dissolved at a rate of less than 1 mg per 1 mAh, less than 0.9 mg per 1 mAh, less than 0.8 mg per 1 mAh, less than 0.7 mg per 1 mAh, less than 0.6 mg per 1 mAh, less than 0.5 mg per 1 mAh, less than 0.4 mg per 1 mAh, less than 0.3 mg per 1 mAh, less than 0.2 mg per 1 mAh, less than 0.1 mg per 1 mAh, less than 0.09 mg per 1 mAh, less than 0.08 mg per 1 mAh, less than 0.07 mg per 1 mAh, less than 0.06 mg per 1 mAh, less than 0.05 mg per 1 mAh, less than 0.04 mg per 1 mAh, less than 0.03 mg per 1 mAh, less than 0.02 mg per 1 mAh, less than 0.01 mg per 1 mAh, less than 9 μg per 1 mAh, less than 8 μg per 1 mAh, less than 7 μg per 1 mAh, less than 6 μg per 1 mAh, less than 5 μg per 1 mAh, less than 4 μg per 1 mAh, less than 3 μg per 1 mAh, less than 2 μg per 1 mAh, less than 1 μg per 1 mAh, on average during the full lifecycle of the battery. As used herein, the term "full lifecycle of the battery" is intended to mean that the life of the battery is considered to have exceeded its normal useful life, which is assumed here to be the point at which the battery shows 80% of its original capacity for the first time. In some embodiments, the greenhouse gas is consumed or dissolved at a rate of less than 0.01 mg per 1 mAh, on average during the full lifecycle of the battery.

In some embodiments, the battery is fabricated in an atmosphere comprising, consisting essentially of, or consisting of a greenhouse gas. In some embodiments, the battery is constructed in an atmosphere that does not comprise a greenhouse gas, and the atmosphere that does not comprise a greenhouse gas is purged from the internal atmosphere of the battery and is replaced by a greenhouse gas, after the battery is fabricated.

In some embodiments, a greenhouse gas is dissolved in an electrolyte (e.g., liquid electrolyte) using an apparatus comprising a pressure gauge, a gas inlet, a gas outlet, and a chemically resistant frit or foam submerged in the liquid electrolyte. The liquid electrolyte is kept under a greenhouse gas at a pressure above a standard atmospheric pressure for at least 10 seconds, at least 20 seconds, at least 30 seconds, at least 40 seconds, at least 50 seconds, at least 60 seconds, at least 70 seconds, at least 80 seconds, at least 90 seconds, at least 100 seconds, or longer, or any range or value therein.

In some embodiments, the liquid electrolyte is kept under a greenhouse gas at a pressure of at least 1 bar, at least 2 bar, at least 3 bar, at least 4 bar, at least 5 bar, at least 6 bar, at least 7 bar, at least 8 bar, at least 9 bar, at least 10 bar, at least 15 bar, at least 20 bar, at least 25 bar, at least 30 bar, at least 35 bar, at least 40 bar, at least 45 bar, at least 50 bar, at least 55 bar, at least 60 bar, at least 65 bar, at least 70 bar, at least 75 bar, at least 80 bar, at least 85 bar, at least 90 bar, at least 95 bar, at least 100 bar, or any range or value therein. In some embodiments, the greenhouse gas may be at a pressure at which it is liquefied.

In some embodiments, the greenhouse gas atmosphere is a "greenhouse gas-rich atmosphere." In some embodiments, the greenhouse gas-rich atmosphere comprises one or more greenhouse gases at a total concentration of at least 10 vol. %, at least 15 vol. %, at least 20 vol. %, at least 25 vol. %, at least 30 vol. %, at least 35 vol. %, at least 40 vol. %, at least 45 vol. %, at least 50 vol. %, at least 55 vol. %, at least 60 vol. %, at least 65 vol. %, at least 70 vol. %, at least 75 vol. %, at least 80 vol. %, at least 85 vol. %, at least 90 vol. %, at least 91 vol. %, at least 92 vol. %, at least 93 vol. %, at least 94 vol. %, at least 95 vol. %, at least 96 vol. %, at least 97 vol. %, at least 98 vol. %, at least 99 vol. %, at least 99.5 vol. %, at least 99.6 vol. %, at least 99.7 vol. %, at least 99.8 vol. %, at least 99.9 vol. %, or any range or value therein.

Inert Gas Atmosphere

In some embodiments, a battery includes an inert gas within the battery. In some embodiments, the battery is fabricated under an inert gas atmosphere, or the inert gas is introduced into the battery before use. In some embodiments, the electrolyte and/or electrode (anode, cathode) materials are in contact with the inert gas. In some embodiments, the inert gas comprises, by way of non-limiting example, nitrogen, argon, helium, neon, argon, krypton, xenon, radon, or any combination thereof.

In some embodiments, the battery is fabricated in an atmosphere comprising, consisting essentially of, or consisting of an inert gas. In some embodiments, the battery is constructed in an atmosphere that does not comprise an inert gas, and the atmosphere that does not comprise an inert gas is purged from the internal atmosphere of the battery and is replaced by an inert gas, after the battery is fabricated.

In some embodiments, an inert is dissolved in an electrolyte (e.g., liquid electrolyte) using an apparatus comprising a pressure gauge, a gas inlet, a gas outlet, and a chemically resistant frit or foam submerged in the liquid electrolyte. The liquid electrolyte is kept under an inert gas at a pressure above a standard atmospheric pressure for at least 10 seconds, at least 20 seconds, at least 30 seconds, at least 40 seconds, at least 50 seconds, at least 60 seconds, at least 70 seconds, at least 80 seconds, at least 90 seconds, at least 100 seconds, or longer, or any range or value therein.

In some embodiments, the inert gas atmosphere is an "inert gas-rich atmosphere." In some embodiments, the inert gas-rich atmosphere comprises one or more inert gases at a total concentration of at least 10 vol. %, at least 15 vol. %, at least 20 vol. %, at least 25 vol. %, at least 30 vol. %, at least 35 vol. %, at least 40 vol. %, at least 45 vol. %, at least 50 vol. %, at least 55 vol. %, at least 60 vol. %, at least 65 vol. %, at least 70 vol. %, at least 75 vol. %, at least 80 vol. %, at least 85 vol. %, at least 90 vol. %, at least 91 vol. %, at least 92 vol. %, at least 93 vol. %, at least 94 vol. %, at least 95 vol. %, at least 96 vol. %, at least 97 vol. %, at least 98 vol. %, at least 99 vol. %, at least 99.5 vol. %, at least 99.9 vol. %, or any range or value therein.

Persons of ordinary skill in the art will recognize that batteries prepared according to the present disclosure, and related fabrication methods, may include any combination of the above components. To demonstrate some of the possible combinations of components for the present technology, below are provided several non-limiting examples of batteries intended to fall within the scope of this disclosure.

In an embodiment, a battery according to the present disclosure comprises an electrolyte comprising an aliphatic nitrile compound, a cathode that comprises a halogenated compound as a cathode active material, and an anode that comprises a metal oxide as an anode active material. The battery may optionally comprise one or both of a plasticizer and a carboxylic acid as part of the anode, cathode, and/or electrolyte materials.

In an embodiment, a battery according to the present disclosure comprises an electrolyte comprising at least three carbonate compounds, a cathode comprising a halogenated compound as a cathode active material, and an anode comprising a non-metal oxide as an anode active material. The battery may optionally comprise one or both of a plasticizer and a carboxylic acid as part of the anode, cathode, and/or electrolyte materials.

In an embodiment, a battery according to the present disclosure comprises a liquid electrolyte comprising a dissolved greenhouse gas. The greenhouse gas is introduced into the liquid electrolyte by using a gas dispersion tubing and is kept above a standard atmospheric pressure. The battery may further comprise a cathode comprising a halogenated compound and/or an electroactive organic material. The battery may optionally comprise one or both of a plasticizer and a carboxylic acid as part of the anode, cathode, and/or electrolyte materials.

In an embodiment, a battery according to the present disclosure comprises a greenhouse gas atmosphere within the battery. The greenhouse gas is not intended to be used as an active material. The greenhouse gas is the greenhouse gas is excluded from an electrochemical reaction during one or more of charging and discharging of the battery. The greenhouse gas is in contact with the electrode and the electrolyte. The electrolyte may be solid. The electrolyte may be liquefied gas. The battery may also include one or both of a plasticizer and a carboxylic acid as part of the anode, cathode, and/or electrolyte materials.

In an embodiment, an apparatus for dissolving greenhouse gas in a liquid electrolyte includes a pressure gauge, a gas inlet, a gas outlet, and a chemically resistant frit or foam submerged in the liquid electrolyte and coupled to the gas inlet. The liquid electrolyte is kept under a greenhouse gas above a standard atmospheric pressure for more than 30 seconds.

In an embodiment, a battery according to the present disclosure comprises a cathode current collector. The cathode current collector is in contact with the cathode comprising a halogenated compound. The current collector may be perforated, wherein the pore size may be 500 nm or above and the distance between pores be 10 μm or above.

In an embodiment, a battery includes an electrolyte additive comprising a heterocyclic compound with a nitrogen atom in its ring and a cathode that comprises a halogenated compound as a cathode active material. The battery may also include one or both of a plasticizer and a carboxylic acid as part of the anode, cathode, and/or electrolyte materials.

In other embodiments and aspects, the battery may include an anode that comprises a material selected from the group consisting of lithium, sodium, potassium, magnesium, calcium, vanadium, aluminum, zinc, silicon, graphite, graphene, porous carbon, activated carbon, a form of silicon, a metal oxide and combinations thereof.

In an embodiment, a method of fabricating a battery includes forming a battery stack comprising a cathode comprising a cathode active material incorporated onto an electrically conductive material, and an electrolyte positioned in and on the cathode. The method also includes introducing greenhouse gas into the battery stack. The electrolyte is in contact with the cathode and the greenhouse gas. The battery may perform at least one charge and/or discharge operation under the greenhouse gas at a current density of 0.1 mA/cm² or below before use.

In an embodiment, a method of fabricating a battery includes forming a battery stack in a greenhouse gas-rich atmosphere. The battery includes a cathode comprising a cathode active material incorporated onto an electrically conductive material, and an electrolyte positioned in and on the cathode. The electrolyte is in contact with the cathode and the greenhouse gas. The battery may perform at least one charge and/or discharge operation under the greenhouse gas at a current density of 0.1 mA/cm² or below before use.

Turning now to the accompanying drawing figures, various exemplary embodiments will be described in turn. It should be appreciated that while the descriptions of the various embodiments herein are written in terms of describing a single cell battery, similar principles may be applied to an assembly that includes greater than one cell battery (e.g., battery packs, etc.). Such multiple-battery assemblies should be understood to fall within the scope of the present disclosure.

FIG. 1 illustrates a schematic view of a battery 100 according to an exemplary embodiment. The battery includes an exterior housing 114 containing a gaseous material or internal atmosphere 112 (e.g., carbon dioxide, carbon monoxide, nitrous oxide, nitrogen, argon, methane, ozone, chlorofluorocarbons, hydrofluorocarbons, or combinations thereof), an anode current collector 104 (e.g., copper, a form of copper, a copper alloy, nickel, a form of nickel, a nickel alloy, duplex steel, stainless steel, silver, a form of silver, a silver alloy, or combinations thereof), an anode 110 (e.g., lithium, sodium, potassium, magnesium, calcium, vanadium, aluminum, zinc, silicon, graphite, graphene, porous carbon, activated carbon, a form of silicon, a metal oxide, or combinations thereof), an electrolyte 106 comprising a heterocyclic compound with at least one nitrogen atom in its ring (e.g., pyridine, imidazole, 1,2,3,6-tetrahydropyridine, piperidine, methylpyridine, aminopyridine, ethynylpyridine, vinylpyridine, dimethylpyridine, ethyl pyridine, lutidine, 4-tert-butylpyridine (TBP), 2,2'-bipyridine (BPY), 1-methylimidazole (MI), 1-methylbenzimidazole (MIB), 1-(trimethylsilyl) imidazole), methylimidazoline, vinylimidazole, dimethylimidazole, mercaptoimidazole, histamine, nitroimidazole, ethylpiperazine, methimazole, thiamazole, 2-mercapto-1-methylimidazole, dicyanoimidazole, or any combination thereof), a cathode 108 comprising a halogenated compound, and a cathode current collector 102 (e.g., aluminum, a form of aluminum, aluminum alloy, nickel, a form of nickel, nickel alloy, duplex steel, stainless steel, titanium, a form of titanium, titanium alloy, or any combination thereof). The electrolyte 106 may be larger in its width and length than the current collector 102, 104 to avoid a contact between the anode and the cathode. The battery can be formed as in button cells, pouch cells, prismatic cells, cylindrical cells, flow cells, in alternating plates, or in jelly rolls, among others.

According to an exemplary embodiment, the battery 100 in the embodiment shown in FIG. 1 includes a halogenated compound as a cathode active material and a heterocyclic compound with at least one nitrogen atom in its ring as an electrolyte material. The electrolyte 106 is positioned in and between the anode 110 and the cathode 108. The battery may also include one or both of a plasticizer and a carboxylic acid as part of the cathode, anode, and/or electrolyte materials. In embodiments, the battery may operate without an anode 110. In the battery without an anode 110, the electrolyte is positioned in the cathode 108 and between the anode current collector 104 and the cathode 108.

Figure 2:
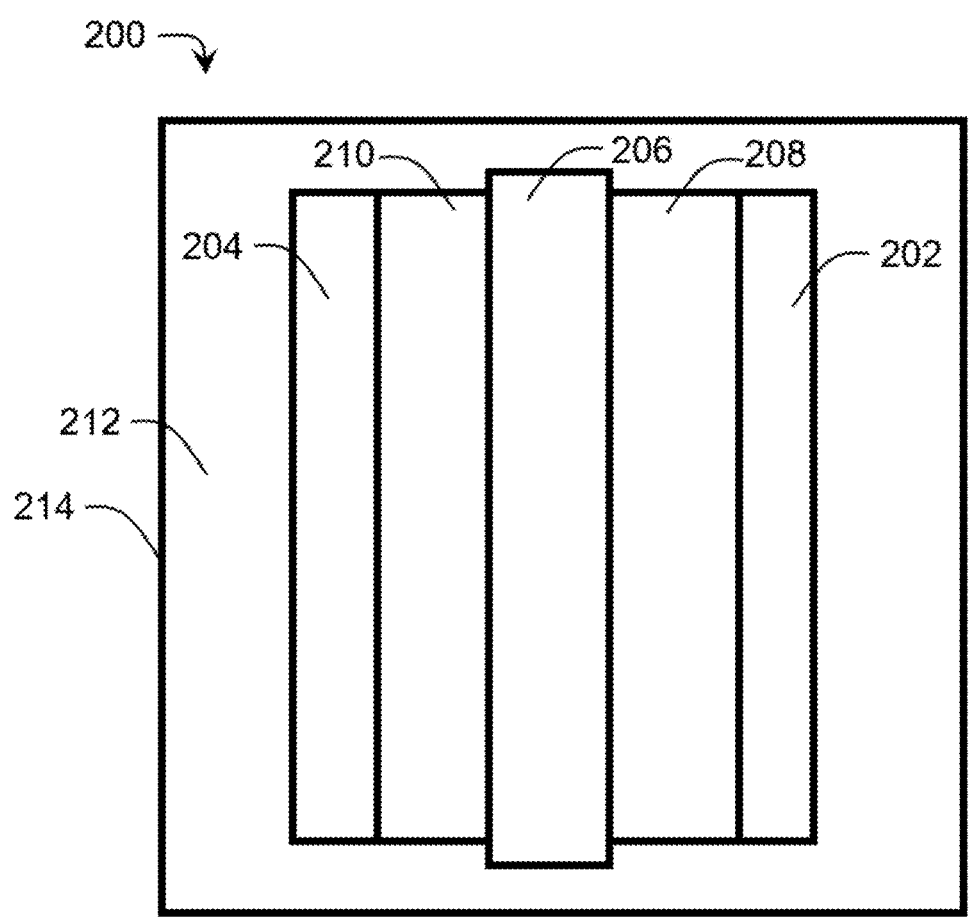
FIG. 2 is a schematic view of a battery according to another exemplary embodiment.

FIG. 2 illustrates a schematic view of a battery 200 according to an exemplary embodiment. The battery includes an exterior housing 214 containing a gaseous material or internal atmosphere 212 (e.g., carbon dioxide, carbon monoxide, nitrous oxide, nitrogen, argon, methane, ozone, chlorofluorocarbons, hydrofluorocarbons), an anode current collector 204 (e.g., copper, a form of copper, a copper alloy, nickel, a form of nickel, a nickel alloy, duplex steel, stainless steel, silver, a form of silver, a silver alloy), a metal oxide anode 210 (e.g., $Li_4Ti_5O_{12}$, $TiO_2$, $TiNb_2O_7$, $Nb_2O_5$, $Li_3VO_4$, $H_2Ti_6O_{13}$, $LiMnBO_3$, $LiV_{0.5}Ti_{0.5}S_2$, $Li_3V_2O_5$, $Li_{3+x}V_2O_5$, $Li_3MoO_4$, $Li_5W_2O_7$, or any combination thereof), an electrolyte 206 comprising an aliphatic nitrile compound (e.g., 3-methoxypropionitrile (MPN), methoxyacetonitrile (MAN), acetonitrile (AN), valeronitrile (VN), succinonitrile, glutaronitrile, adiponitrile, acrylonitrile, propionitrile, tolunitrile, methoxybenzonitrile, malononitrile, or any combination thereof), a cathode 208 comprising a halogenated compound, and a cathode current collector 202 (e.g., aluminum, a form of aluminum, aluminum alloy, nickel, a form of nickel, nickel alloy, duplex steel, stainless steel, titanium, a form of titanium, titanium alloy, or any combination thereof). The electrolyte 206 may be larger in its width and length than the anode current collector 204 or cathode current collector 202 to avoid a contact between the anode 210 and the cathode 208. The battery can be formed as in button cells, pouch cells, prismatic cells, cylindrical cells, flow cells, in alternating plates, or in jelly rolls, among others.

According to an exemplary embodiment, the battery 200 in the embodiment shown in FIG. 2 includes a halogenated compound as a cathode active material, an aliphatic nitrile compound as an electrolyte material, and a metal oxide as an anode active material. The electrolyte 206 is positioned in and between the anode 210 and the cathode 208. The battery 200 may also include one or both of a plasticizer and a carboxylic acid as part of the anode, cathode, and/or electrolyte materials.

Figure 3:
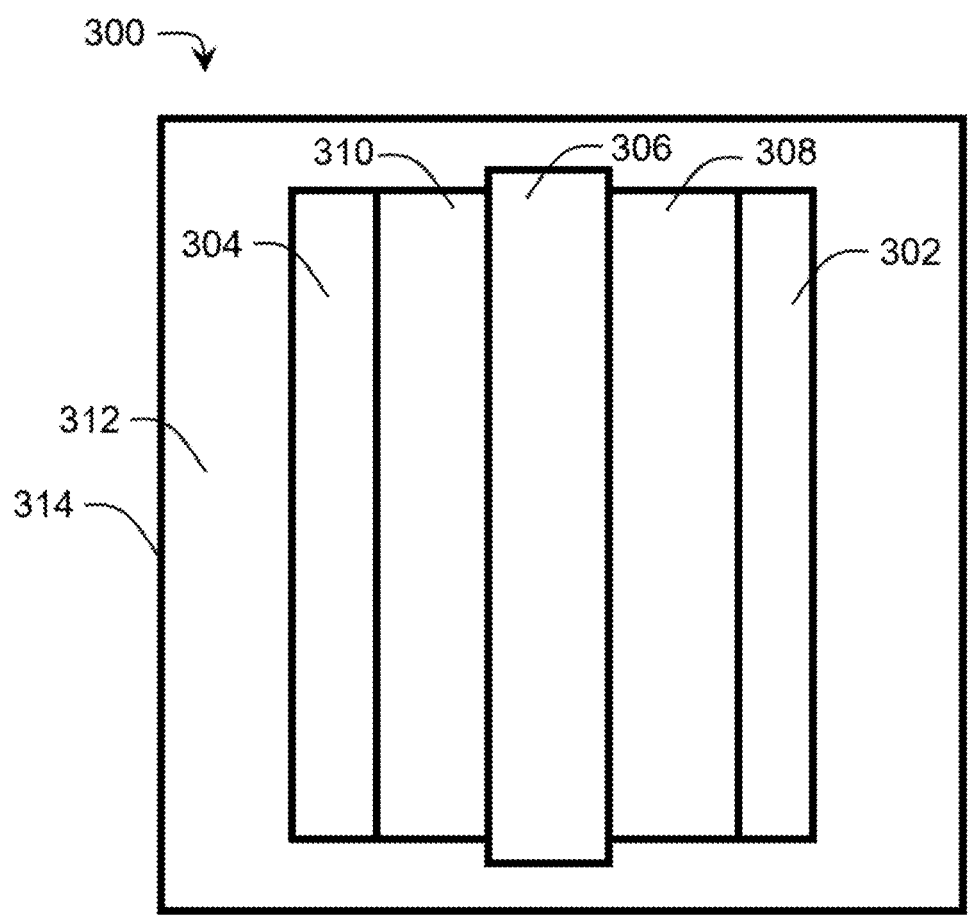
FIG. 3 is a schematic view of a battery according to another exemplary embodiment.

FIG. 3 illustrates a schematic view of a battery 300 according to an exemplary embodiment. The battery 300 includes an exterior housing 314 containing a gaseous material or internal atmosphere 312 (e.g., carbon dioxide, carbon monoxide, nitrous oxide, nitrogen, argon, methane, ozone, chlorofluorocarbons, hydrofluorocarbons), an anode current collector 304 (e.g., copper, a form of copper, a copper alloy, nickel, a form of nickel, a nickel alloy, duplex steel, stainless steel, silver, a form of silver, a silver alloy), a non-metal oxide anode 310 (e.g., silicon, graphite, graphene, porous carbon, activated carbon, a form of silicon), an electrolyte 306 comprising at least three carbonate compounds (e.g. ethylene carbonate (EC), diethyl carbonate (DEC), dimethyl carbonate (DMC), ethyl methyl carbonate (EMC), propylene carbonate (PC), dipropyl carbonate (DPC), fluoroethylene carbonate (FEC)), a cathode 308 comprising a halogenated compound, and a cathode current collector 302 (e.g., aluminum, a form of aluminum, aluminum alloy, nickel, a form of nickel, nickel alloy, duplex steel, stainless steel, titanium, a form of titanium, titanium alloy, or any combination thereof). The electrolyte 306 may be larger in its width and length than the anode current collector 304 or cathode current collector 302 to avoid a contact between the anode and the cathode. The battery can be formed as in button cells, pouch cells, prismatic cells, cylindrical cells, flow cells, in alternating plates, or in jelly rolls, among others.

According to an exemplary embodiment, the battery 300 in the embodiment shown in FIG. 3 includes a halogenated compound as a cathode active material, a non-metal oxide material as an anode active material, and at least three carbonate compounds as an electrolyte material. The electrolyte 306 is positioned in and between the anode 310 and the cathode 308. The battery may also include one or both of a plasticizer and a carboxylic acid as part of the anode, cathode, and/or electrolyte material.

Figure 4:
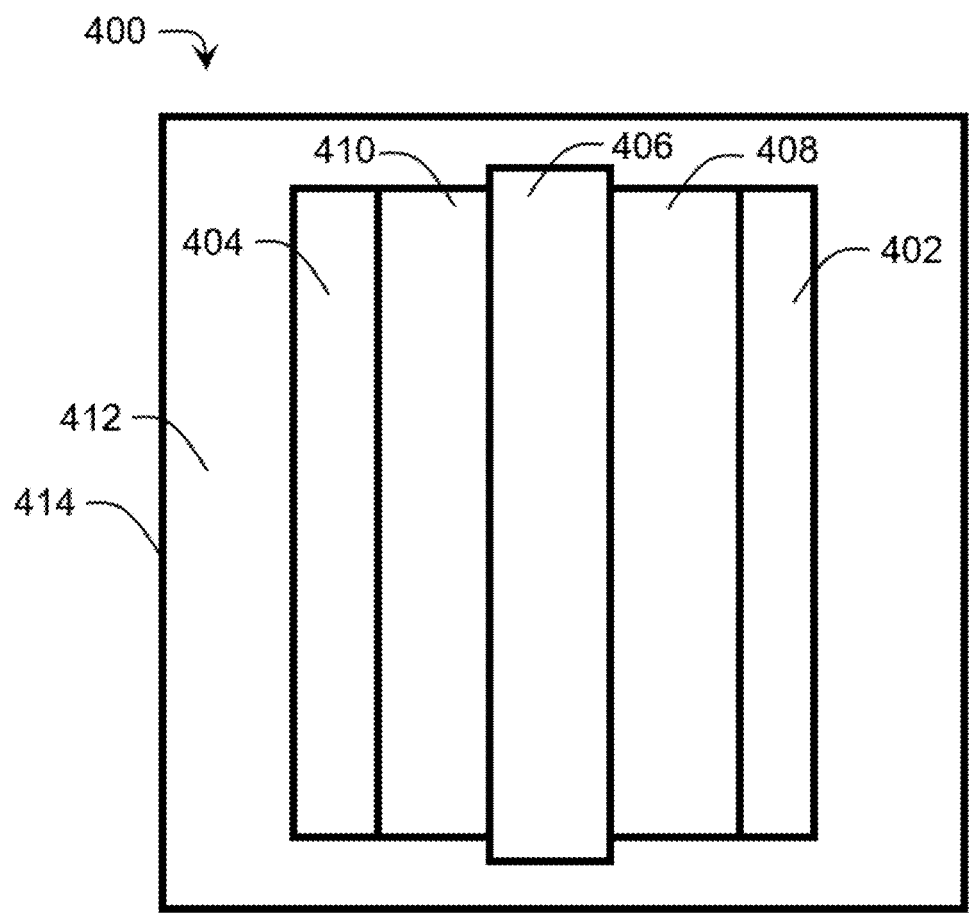
FIG. 4 is a schematic view of a battery according to another exemplary embodiment.

FIG. 4 illustrates a schematic view of a battery 400 according to an exemplary embodiment. The battery includes an exterior housing 414 containing a greenhouse gas 412 (e.g., carbon dioxide ($CO_2$), carbon monoxide (CO), ozone ($O_3$), methane ($CH_4$), tetrafluoromethane ($CF_4$), hexafluoroethane ($C_2F_6$), sulfur hexafluoride ($SF_6$), carbon tetrachloride ($CCl_4$), nitrous oxide ($N_2O$), sulfur dioxide ($SO_2$), carbon disulfide ($CS_2$), and carbonyl sulfide (COS), or any combination thereof), an anode current collector 404 (e.g., copper, a form of copper, a copper alloy, nickel, a form of nickel, a nickel alloy, duplex steel, stainless steel, silver, a form of silver, a silver alloy, or any combination thereof), an anode 410 (e.g., lithium, sodium, potassium, magnesium, calcium, vanadium, aluminum, zinc, silicon, graphite, graphene, porous carbon, activated carbon, a form of silicon, a metal oxide, or any combination thereof), an electrolyte 406 (e.g., phosphates, fluorophosphates, amines, borates, fluoroborates, halides, halates, oxohalides, perovskites, antiperovskites, LISICON-types, garnets, sulfides, thio-LISICON types, oxynitrides, or any combination thereof), a cathode 408 (e.g., a form of sulfur, a sulfide, a form of oxygen, an oxide, an organic material having a conjugated cyclic structure, a halogenated compound, or any combination thereof), and a cathode current collector 402 (e.g., aluminum, a form of aluminum, aluminum alloy, nickel, a form of nickel, nickel alloy, duplex steel, stainless steel, titanium, a form of titanium, titanium alloy, or any combination thereof). The electrolyte 406 may be larger in its width and length than the cathode current collector 402 or the anode current collector 404 to avoid a contact between the anode 410 and the cathode 408. The battery can be formed as in button cells, pouch cells, prismatic cells, cylindrical cells, flow cells, in alternating plates, or in jelly rolls, among others.

According to an exemplary embodiment, the atmosphere 412 of the battery in the embodiment shown in FIG. 4 includes a greenhouse gas wherein the carbon dioxide is not used as an active material. The greenhouse gas is the greenhouse gas is excluded from an electrochemical reaction during one or more of charging and discharging of the battery. The greenhouse gas 412 is in contact with the cathode 408, anode 410, and the electrolyte 406. The greenhouse gas is on the surface, in the pores, and on the interface among the cathode 408 and the electrolyte 406 materials. The battery 400 may also include a solid-state electrolyte. The battery 400 may also include a halogenated compound as a cathode material. The battery may also include a perforated current collector 402 with the pore size of 500 nm or above and the distance between pores of 10 μm or above. The battery may also include one or both of a plasticizer and a carboxylic acid as part of the cathode 408, anode 410, and electrolyte 406 material. The battery 400 may operate without an anode 410. In the battery without an anode 410, the electrolyte 406 is positioned in the cathode 408 and between the anode current collector 404 and the cathode 408.

Methods for Fabricating a Battery

The present disclosure also relates to methods for fabricating batteries as disclosed above.

In some embodiments, the battery electrolyte material comprises a dissolved greenhouse gas which is introduced into the electrolyte before including the electrolyte in the battery.

Figure 5:
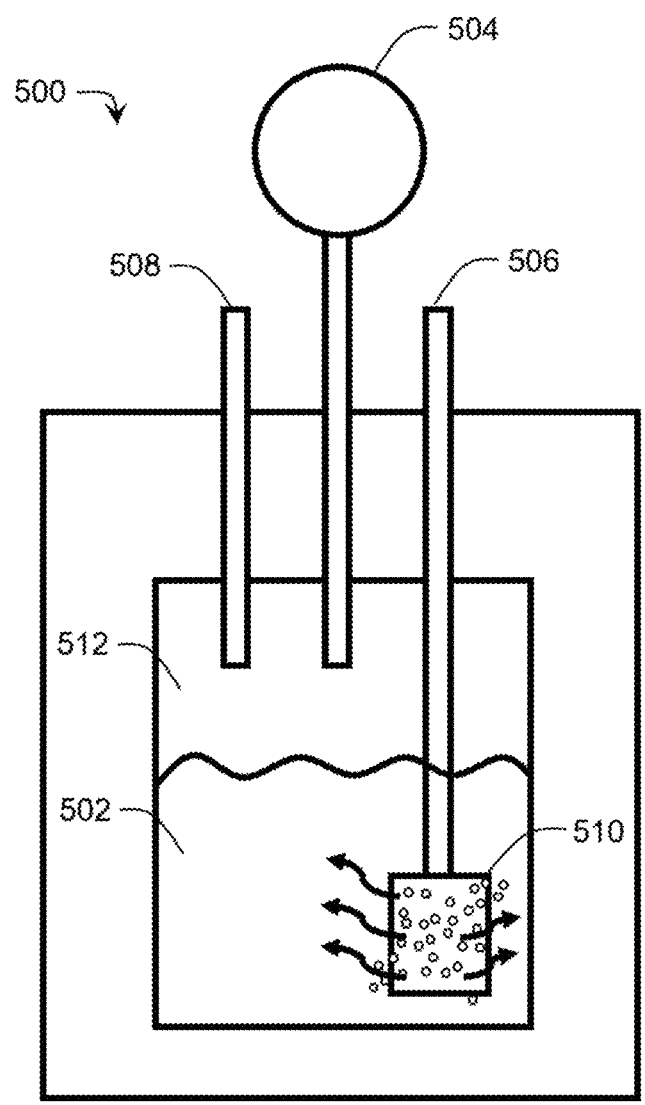
FIG. 5 is a schematic view of an apparatus for dissolving a greenhouse gas in a liquid electrolyte.

Referring now to FIG. 5, an apparatus 500 for dissolving greenhouse gas in a liquid electrolyte 502 comprises a pressure gauge 504, a gas inlet 506, a gas outlet 508, and a chemically resistant frit or foam 510 coupled to the gas inlet 506 and submerged in the liquid electrolyte 502. The liquid electrolyte 502 is kept under greenhouse gas 512 above a standard atmospheric pressure for more than 30 seconds. As used herein, the term "standard atmospheric pressure" is intended to mean a unit of pressure defined as 101,325 Pa, which is equivalent to 760 mm Hg, 29.9212 inches Hg, 14.696 psi, or 1.013 bar.

Figure 6:
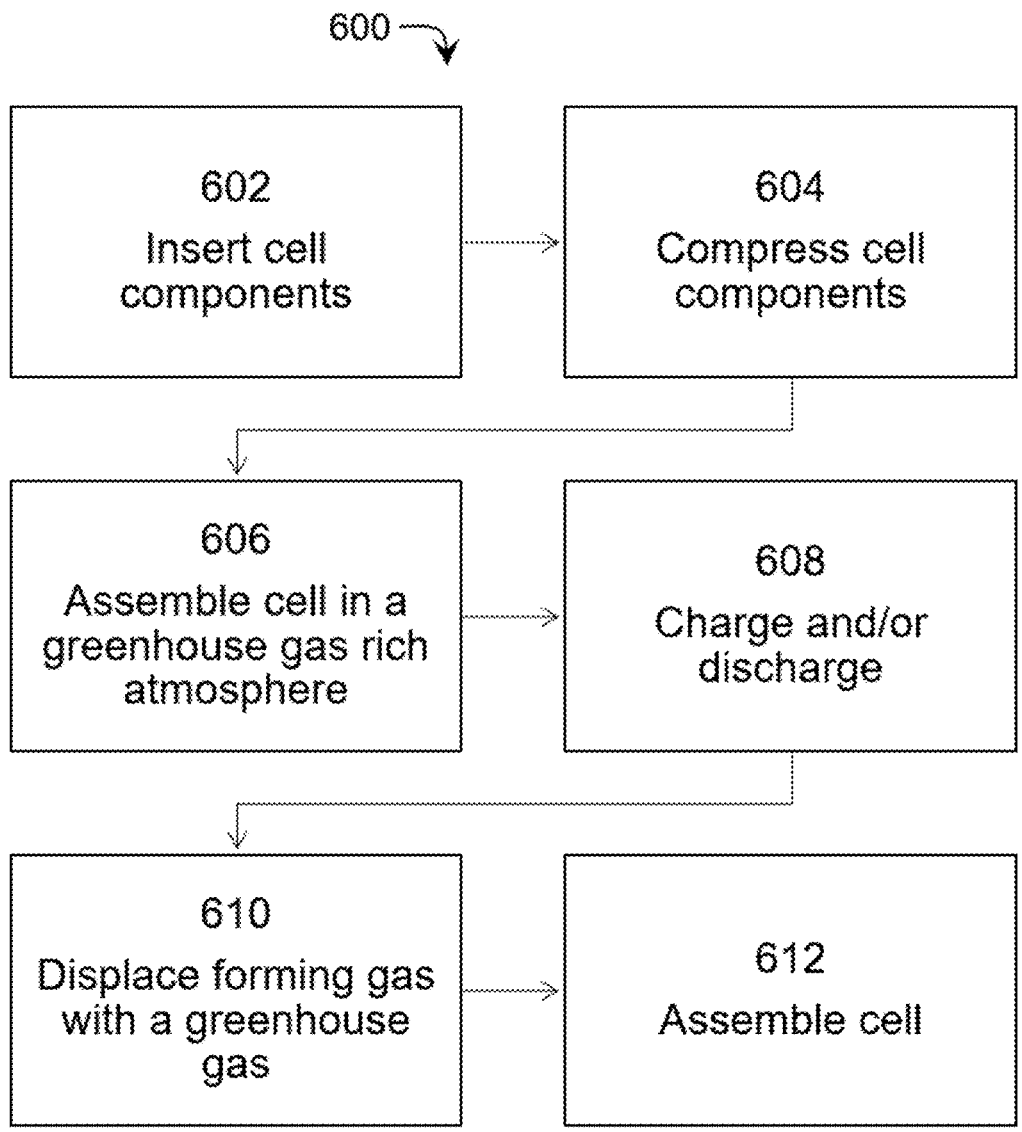
FIG. 6 is a flow chart of a method of fabricating a battery according to an exemplary embodiment.

FIG. 6 is a flow chart of a method 600 of fabricating a battery according to an exemplary embodiment. Fabricating the battery starts with a step of inserting 602 all the cell components into an exterior housing in the order of an anode current collector, an anode, an electrolyte, a cathode, and a cathode current collector or vice versa. The second step is to compress 604 the cell components with a press so that the electrolyte is homogeneously in contact with the active anode and cathode materials. The amount of pressure needs to be controlled in order forthe anode and the cathode to be clearly separated. The third step is to assemble and close 606 the cell in a greenhouse gas rich atmosphere. The greenhouse gas in the battery is expected to chemically and/or electrochemically generate a protective layer on the surface of the anode active material, the cathode active material, and/or the electrolyte materials that is beneficial to lower the interfacial and/or charge transfer resistance. The protective layer may comprise one or more of carbon, sulfur, and oxygen. The protective layer may preferably comprise carbon and oxygen. The protective layer may be electrically insulating at room temperature. As used herein, the term "electrically insulating" is intended to mean that a material has an electrical conductivity of less than $10^{-2}$ S/cm, preferably less than $10^{-4}$ S/cm, and more preferably, less than $10^{-6}$ S/cm. The use of greenhouse gas can also add electroactive functional groups on the surface of the electrode materials and/or redesign the chemical structure of the electrode materials that may contribute to storing more energy per a unit mass or area of the electrode. The fourth step is to charge and/or discharge 608 the battery at least one time. The charging and/or discharging of the battery may be done at a current density of 0.1 $mA/cm^2$ or below. The fifth step is to reopen the battery to lower pressure and to displace 610 a forming gas generated during the charge and/or discharge with the greenhouse gas, with the goal of removing the forming gas from within the battery (some other gases in addition to greenhouse gas may be present at the conclusion of this step). The sixth step is to reassemble and close 612 the cell under the greenhouse gas rich atmosphere.

In some embodiments, the cathode is produced by a method comprising: casting the cathode active material from solution; and drying the cast cathode active material under vacuum at a temperature of about 30° C. or less (e.g., room temperature).

Figure 7:
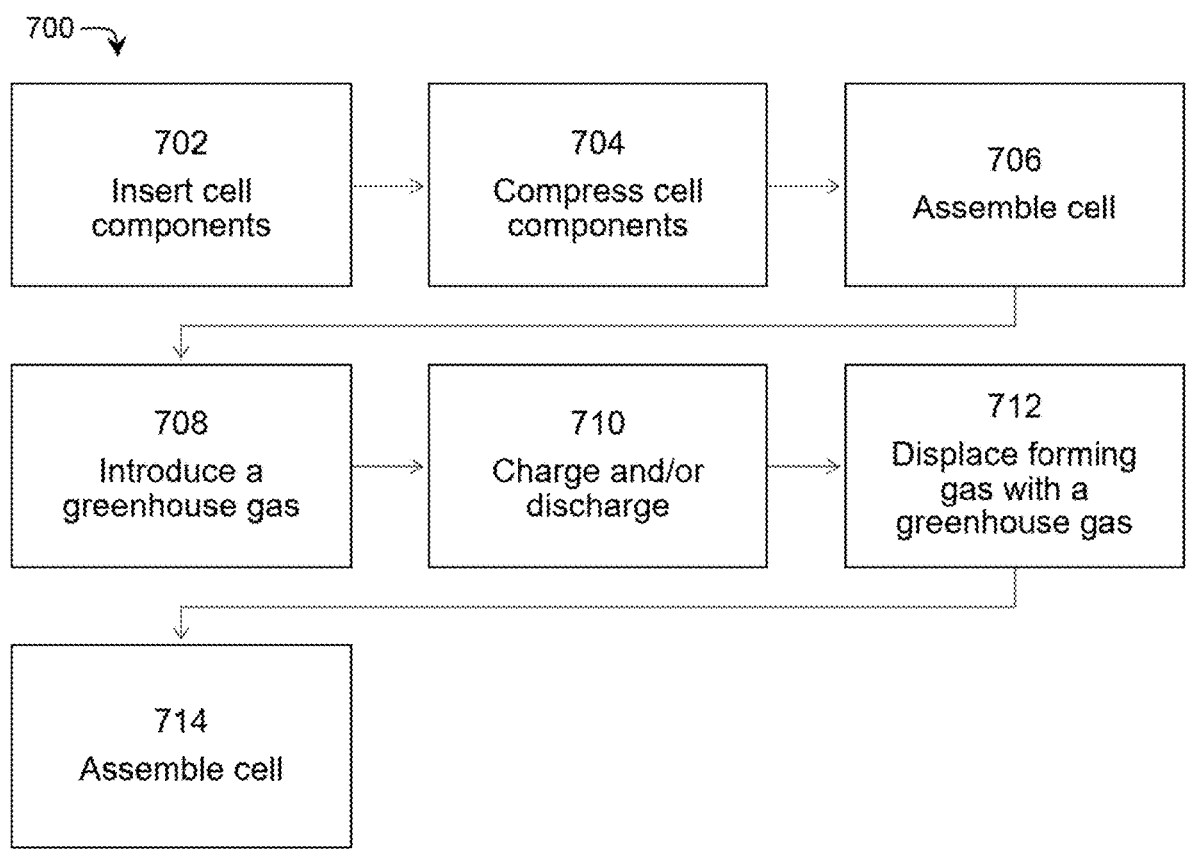
FIG. 7 is a flow chart of a method of fabricating a battery according to another exemplary embodiment.

FIG. 7 is a flow chart of a method 700 of fabricating a battery according to another exemplary embodiment. Fabricating the battery starts with a step of inserting 702 all the cell components into an exterior housing in the order of an anode current collector, an anode, an electrolyte, a cathode, and a cathode current collector or vice versa. The second step is to compress 704 the cell components with a press so that the electrolyte is homogeneously in contact with the active anode and cathode materials. The amount of pressure needs to be controlled in order for the anode and the cathode to be clearly separated. The third step is to assemble and close 706 the cell. The fourth step 708 comprises purging through quick connectors on inlet and outlet feeds of the exterior housing and introducing a greenhouse gas to the cell components. The fifth step is to charge and/or discharge 710 the battery at least one time. The charging and/or discharging of the battery may be done at a current density of 0.1 $mA/cm^2$ or below. The sixth step is to reopen the cell and displace 712 a forming gas generated during the charge and/or discharge with the greenhouse gas, with the goal of removing the forming gas from within the battery (some other gases in addition to greenhouse gas may be present at the conclusion of this step). The seventh step is to reassemble and close 714 the cell under the greenhouse gas atmosphere.

In some embodiments, the cathode is produced by a method comprising: casting the cathode active material from solution; and drying the cast cathode active material under vacuum at a temperature of about 30° C. or less (e.g., room temperature).

Figure 8:
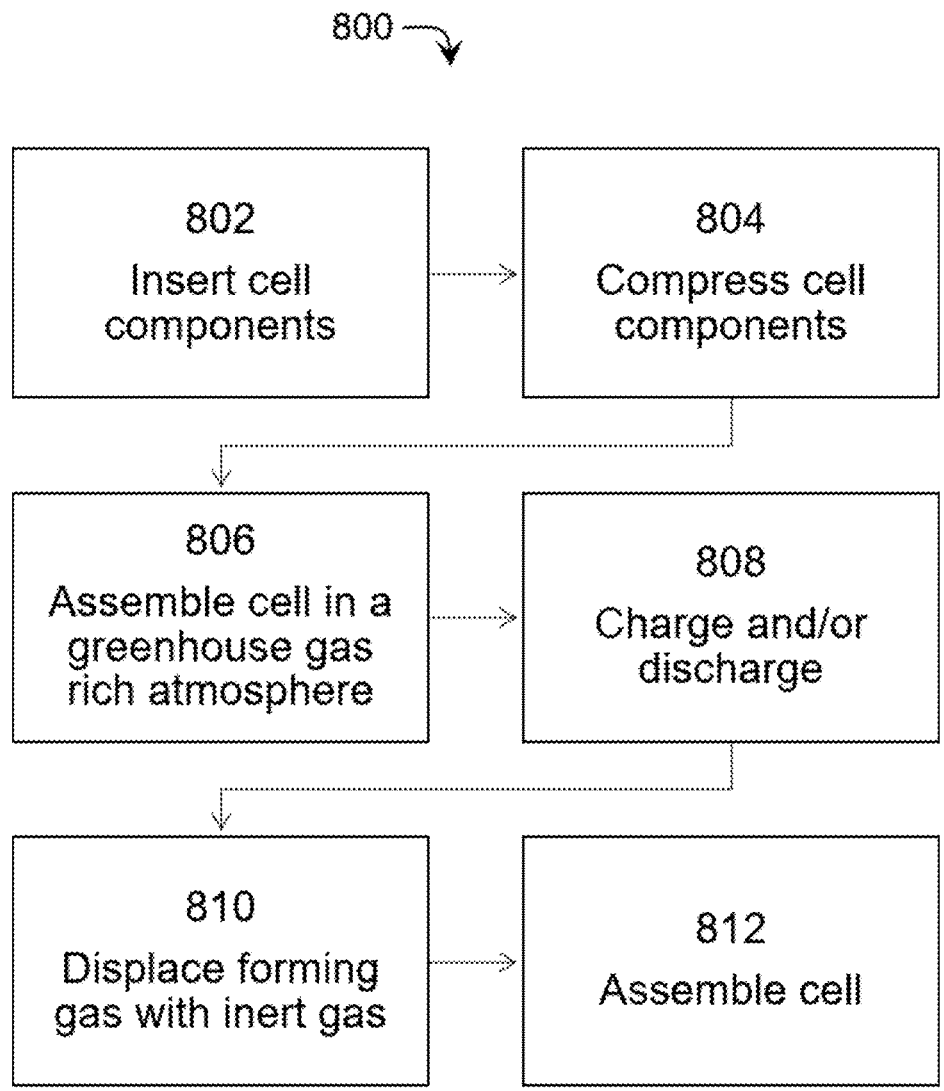
FIG. 8 is a flow chart of a method of fabricating a battery according to another exemplary embodiment.

FIG. 8 is a flow chart of a method 800 of fabricating a battery according to another exemplary embodiment. Fabricating the battery starts with a step of inserting 802 all the cell components into an exterior housing in the order of an anode current collector, an anode, an electrolyte, a cathode, and a cathode current collector or vice versa. The second step is to compress 804 the cell components with a press so that the electrolyte is homogeneously in contact with the active anode and cathode materials. The amount of pressure needs to be controlled in order for the anode and the cathode to be clearly separated. The third step is to assemble and close 806 the cell in a greenhouse gas rich atmosphere. The fourth step is to charge and/or discharge 808 the battery at least one time. The charging and/or discharging of the battery may be done at a current density of 0.1 $mA/cm^2$ or below. The fifth step is to reopen the cell and displace 810 a forming gas generated during the charge and/or discharge with an inert gas such argon or nitrogen, with the goal of removing the forming gas from within the battery (some other gases in addition to the inert gas may be present at the conclusion of this step). The sixth step is to reassemble and close 812 the cell under the inert gas atmosphere. The inert gas such as argon or nitrogen may reduce the risk of having structural disorder of the electrode and the electrolyte materials of the battery when cycling many times.

In some embodiments, the cathode is produced by a method comprising: casting the cathode active material from solution; and drying the cast cathode active material under vacuum at a temperature of about 30° C. or less (e.g., room temperature).

Figure 9:
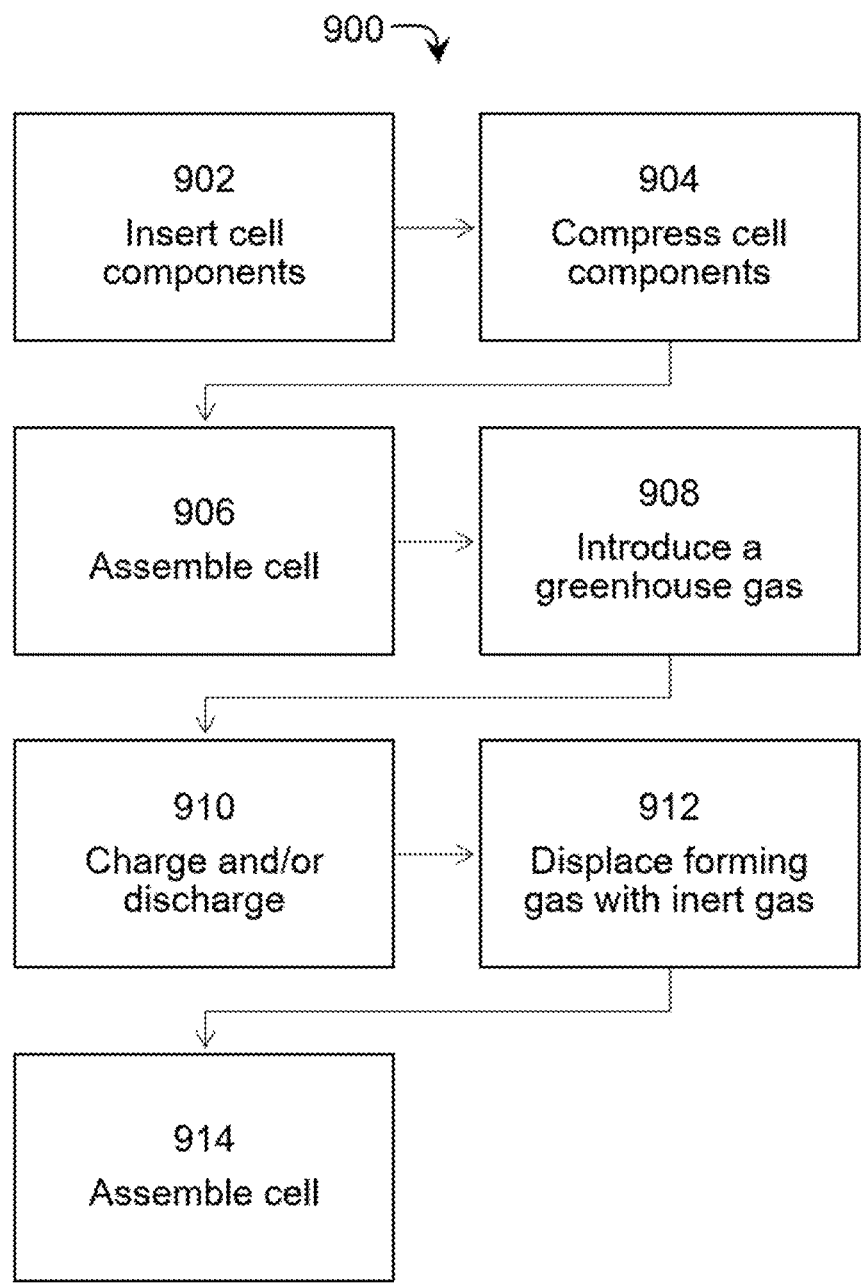
FIG. 9 is a flow chart of a method of fabricating a battery according to another exemplary embodiment.

FIG. 9 is a flow chart of a method 900 of fabricating a battery according to another exemplary embodiment. Fabricating the battery starts with a step of inserting 902 all the cell components into an exterior housing in the order of an anode current collector, an anode, an electrolyte, a cathode, and a cathode current collector or vice versa. The second step is to compress 904 the cell components with a press so that the electrolyte is homogeneously in contact with the active anode and cathode materials. The amount of pressure needs to be controlled in order for the anode and the cathode to be clearly separated. The third step is to assemble and close 906 the cell. The fourth step involves purging through quick connectors on inlet and outlet feeds of the exterior housing and introducing 908 a greenhouse gas to the cell components. The fifth step is to charge and/or discharge 910 the battery at least one time. The charging and/or discharging of the battery may be done at a current density of 0.1 $mA/cm^2$ or below. The sixth step is to reopen the cell and displace 912 a forming gas generated during the charge and/or discharge with an inert gas such as argon or nitrogen, with the goal of removing the forming gas from within the battery (some other gases in addition to the inert gas may be present at the conclusion of this step). The seventh step is to reassemble and close 914 the cell under the inert gas atmosphere.

In some embodiments, the cathode is produced by a method comprising: casting the cathode active material from solution; and drying the cast cathode active material under vacuum at a temperature of about 30° C. or less (e.g., room temperature).

EXAMPLES

Examples 1-4: Rate Capability Versus Conventional Battery Materials

Batteries according to the present disclosure were assembled by the following procedure. A solution including 1 mmol 1,2,4,5-benzenetetramine tetrahydrochloride, 1 mmol hexaketocyclohexane octahydrate, 1M lithium iodide and 50 mmol succinonitrile in 10 mL of diethyl ether was drop-cast onto a 316L stainless steel mesh current collector with the wire diameter of 0.05 mm and the aperture of 0.08 mm. The current collector had been coated via electrospraying with a conductive porous carbon film with a thickness of about 110 μm. The current collector was dried under vacuum at room temperature (approximately 25° C.) for 12 hours. The batteries used lithium titanate ($Li_4Ti_5O_{12}$) as an insertion-type metal oxide anode. The lithium titanate electrode had a thickness of approximately 150 μand a porosity of approximately 60%. Four different nitrile-based electrolyte solutions (Example 1: 1M lithium bistrifluoromethanesulfonimidate (LiTFSI) in MPN; Example 2: 1M LiTFSI-MAN; Example 3: 1M LiTFSI-AN; Example 4: 1M LiTFSI-AN-VN (85:15 in volume ratio)) were prepared to test in comparison to a similar battery having a conventional carbonate-based electrolyte (Comparative Example 1: 1M lithium hexafluorophosphate ($LiPF_6$) in EC-DEC (50:50 volume ratio)). All electrolytes comprised dissolved carbon dioxide. After assembly in an argon-filled glovebox (<0.1 ppm $O_2$, <0.1 ppm $H_2O$), each cell was purged, and carbon dioxide gas was introduced into the cell outside of the glovebox.

Figure 10:
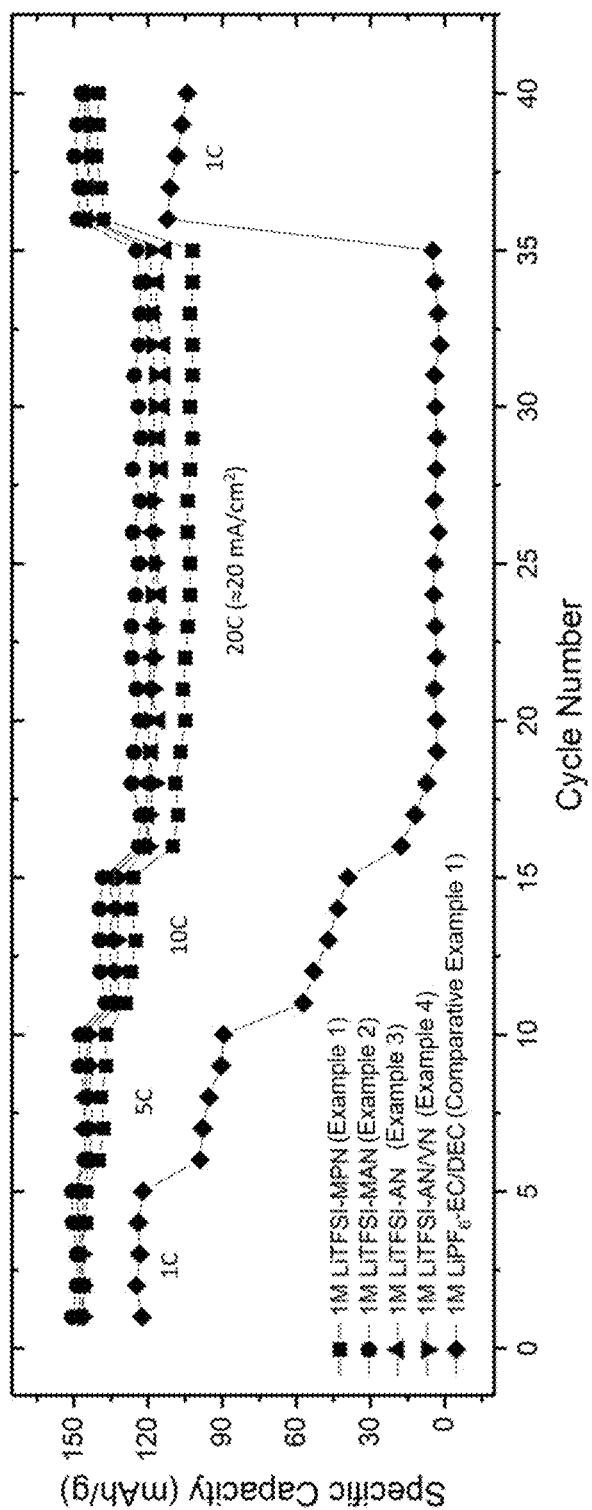
FIG. 10 is a plot showing the high-rate capability of a battery comprising a halogenated compound as a cathode active material, a metal oxide as an anode active material, an aliphatic nitrile compound as an electrolyte, a plasticizer, a carboxylic acid and carbon dioxide.

FIG. 10 shows a plot illustrating the high-rate capability of a battery comprising a halogenated compound as a cathode active material, a metal oxide as an anode active material, an aliphatic nitrile compound as an electrolyte, a plasticizer, a carboxylic acid and carbon dioxide. The "rate capability" is defined as the current divided by the theoretical current draw under which the battery would deliver its nominal rated capacity in one hour. As used herein, the unit "C" is intended to mean a C-rate that is a measure of the rate at which a battery is being charged or discharged with 90% of its original specific capacity. As shown in FIG. 10, batteries according to the present disclosure (Examples 1-4) showed markedly higher rate capability up to 20 mA/cm2 (~20 C) than a similar battery prepared using a conventional electrolyte (Comparative Example 1).

Example 5: Low-Temperature Performance

To test the low-temperature performance of batteries prepared according to the present disclosure, a battery was prepared in a manner similar to Example 2 above, comprising a halogenated compound as a cathode active material, an aliphatic nitrile compound as an electrolyte, a heterocyclic compound with a nitrogen atom in its ring as an electrolyte additive, oxalic acid as a carboxylic acid, succinonitrile as a plasticizer, a lithium metal anode, and carbon dioxide internal atmosphere. In particular, the electrolyte used in Example 5 was 1M LiTFSI-MAN with 5 wt. % of 1-methylbenzimidazole (MIB) as electrolyte additive.

Figure 11:
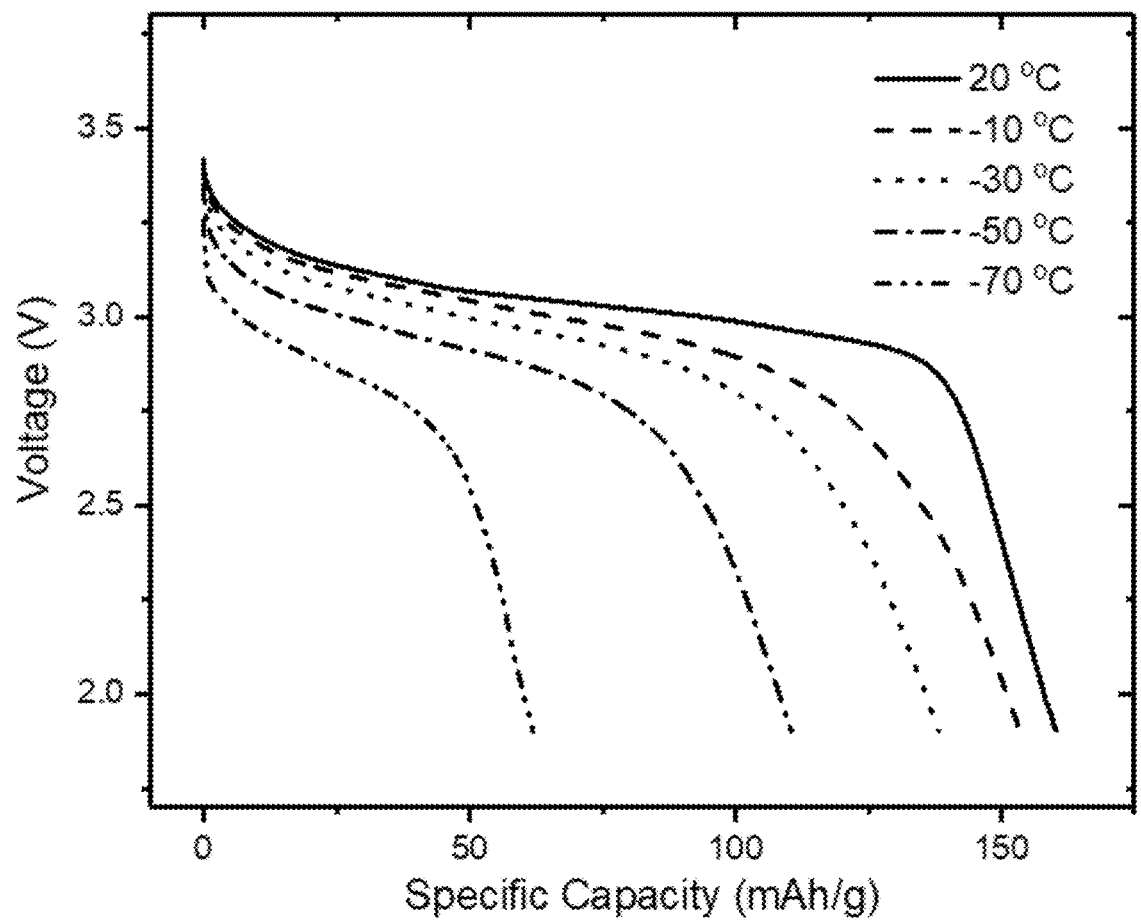
FIG. 11 is a plot showing low temperature performance of a battery comprising a halogenated compound as a cathode active material, a metal oxide as an anode active material, a nitrile and a heterocyclic compound with a nitrogen atom in its ring as an electrolyte, a plasticizer, a carboxylic acid, and carbon dioxide.

FIG. 11 is a plot of voltage versus specific capacity illustrating the low-temperature performance of Example 5. The battery achieved nearly 40% of its capacity at room temperature when the battery operated at the temperature of −70° C., demonstrating the ability of batteries according to the present disclosure to achieve relatively high capacity at low operating temperatures.

Figure 12:
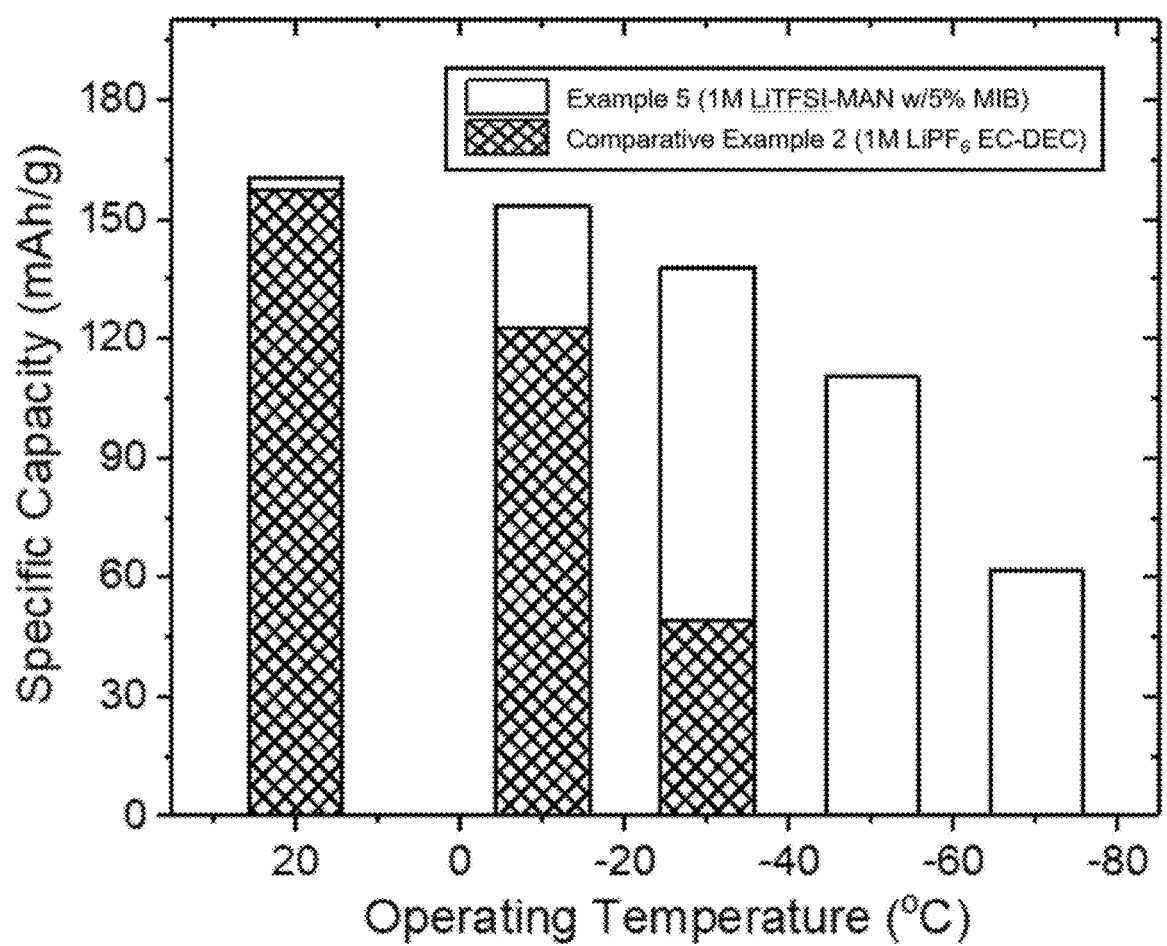
FIG. 12 is a plot showing specific capacity at low operating temperature for a battery comprising a halogenated compound as cathode active material, lithium metal as anode, an aliphatic nitrile compound (LiTFSI-MAN) as an electrolyte, a heterocyclic compound with a nitrogen atom in its ring (5% MIB) as an electrolyte additive, succinonitrile as a plasticizer, a carboxylic acid, and carbon dioxide internal atmosphere, versus that observed for a convention battery using a LiPF6-based electrolyte and NMC111 cathode.

FIG. 12 compares the specific capacity at low temperature of Example 5 (1M LiTFSI-MAN with 5 wt. % of 1-methylbenzimidazole (MIB)) to that observed for an equivalent battery (Comparative Example 2) prepared using 1 M $LiPF_6$ in EC-DEC as the electrolyte material, NMC111 ($LiNi_{0.33}Mn_{0.33}Co_{0.33}O_2$) as the cathode material, and Li metal as the anode material. As shown in FIG. 12, batteries according to the present disclosure exhibit higher specific capacity at low operating temperature when compared to conventional batteries.

Examples 6-9: Specific Capacity as a Function of Electrolyte Additive Concentration To test the effect of different electrolyte additives on the specific capacity of batteries according to the present disclosure, lithium-ion batteries were prepared using a halogenated compound as a cathode active material, an aliphatic nitrile compound as an electrolyte, a heterocyclic compound with a nitrogen atom in its ring as an electrolyte additive, and further including a plasticizer, a carboxylic acid and carbon dioxide internal atmosphere. In particular, a solution including lithium iodide, oxalic acid and succinonitrile in diethyl ether was dropcast onto a 316L stainless steel mesh current collector that had coated with a conductive porous carbon via electrospraying. The current collector with the casted solution was then dried under vacuum at room temperature for 12 hours. Four different heterocyclic compounds were used as the electrolyte additive (Example 6: 4-tert-butylpyridine (TBP); Example 7: 2,2'-bipyridine (BPY); Example 8: 1-methylimidazole (MI); and Example 9: 1-methylbenzimidazole (MIB)). In each battery, the electrolyte comprised dissolved carbon dioxide. After cell assembly within an argon-filled glovebox (<0.1 ppm $O_2$, <0.1 ppm $H_2O$), each cell was removed from the glovebox, purged, and filled with carbon dioxide.

Figure 13:
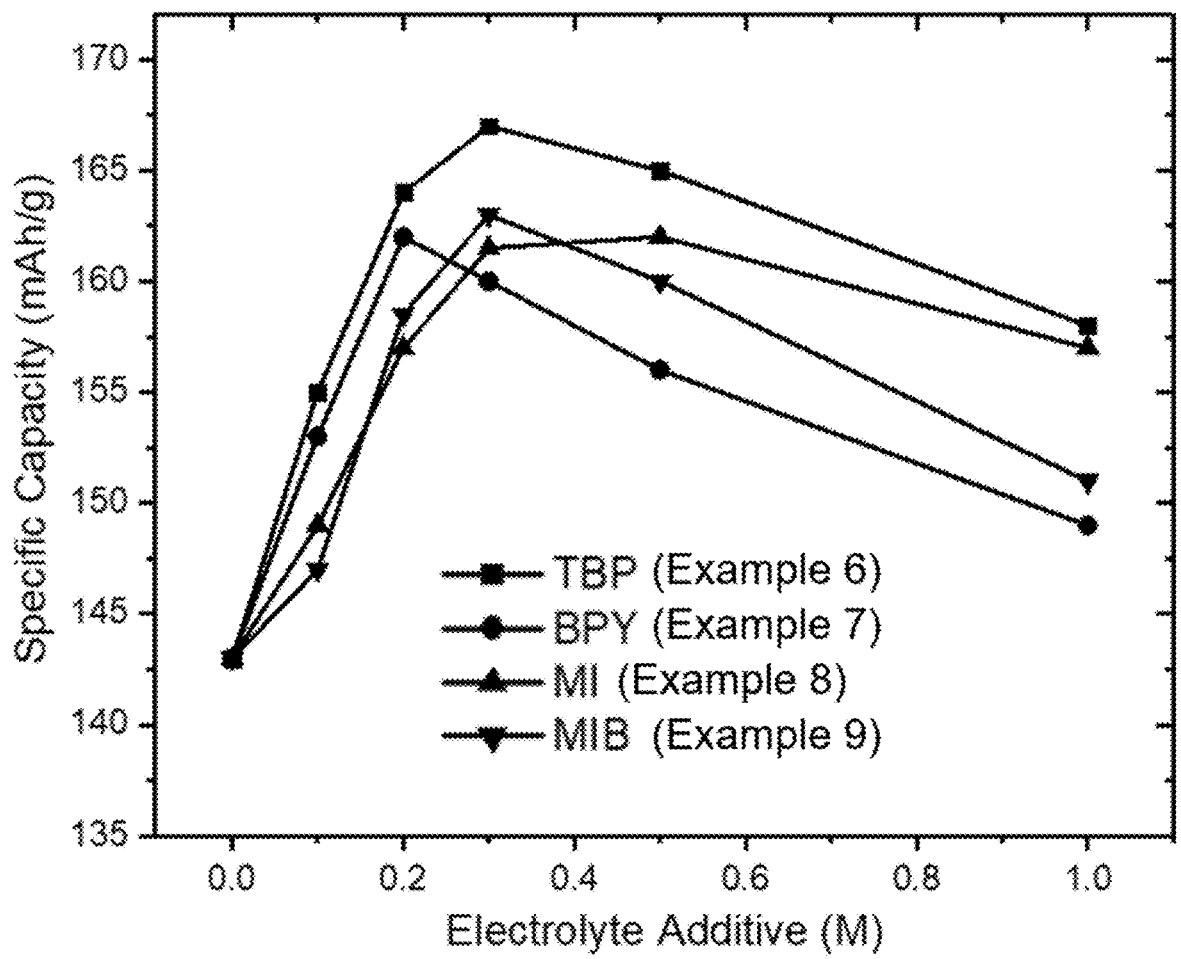
FIG. 13 is a plot showing the specific capacity of a battery comprising a halogenated compound as a cathode active material, an aliphatic nitrile compound as an electrolyte, a heterocyclic compound with a nitrogen atom in its ring as an electrolyte additive, a plasticizer, a carboxylic acid, and carbon dioxide, as a function of the electrolyte additive.

FIG. 13 is a plot showing the specific capacity of Examples 6-9, with respect to the amount of the electrolyte additive. Examples 6-9 demonstrated relatively high specific capacity over 160 mAh/g, with the use of 0.2 M or above of their respective heterocyclic compounds in the electrolyte solution. With the exception of Example 7 (BPY), each cell showed a maximum specific capacity at an electrolyte additive concentration of approximately 0.3 M.

Operating Voltage as a Function of Electrolyte Additive

To test the average operating voltage of batteries according to the present disclosure using a variety of electrolyte additives, batteries were prepared in the same manner as described above for Examples 1-9, using four different heterocyclic compounds as electrolyte additives. In particular, a solution including lithium iodide and succinonitrile in diethyl ether was dropcast onto a 316L stainless steel mesh current collector that had been coated with a conductive porous carbon via electrospraying. The current collector with the casted solution was then dried under vacuum at room temperature for 12 hours. Four different heterocyclic compounds were used as the electrolyte additive: 4-tert-butylpyridine (TBP) (Example 6); 2,2'-bipyridine (BPY) (Example 7); 1-methylimidazole (MI) (Example 8); and 1-methylbenzimidazole (MIB) (Example 9). Comparative Example 3 is a battery prepared in the same manner as above, having succinonitrile (SN) as an electrolyte additive.

Comparative Example 4 includes polyethylene oxide (PEO) as an electrolyte additive. Comparative Example 5 has no electrolyte additive. In each battery, the electrolyte comprised dissolved carbon dioxide. After cell assembly within an argon-filled glovebox (<0.1 ppm $O_2$, <0.1 ppm $H_2O$), each cell was removed from the glovebox, purged, and filled with carbon dioxide.

Figure 14:
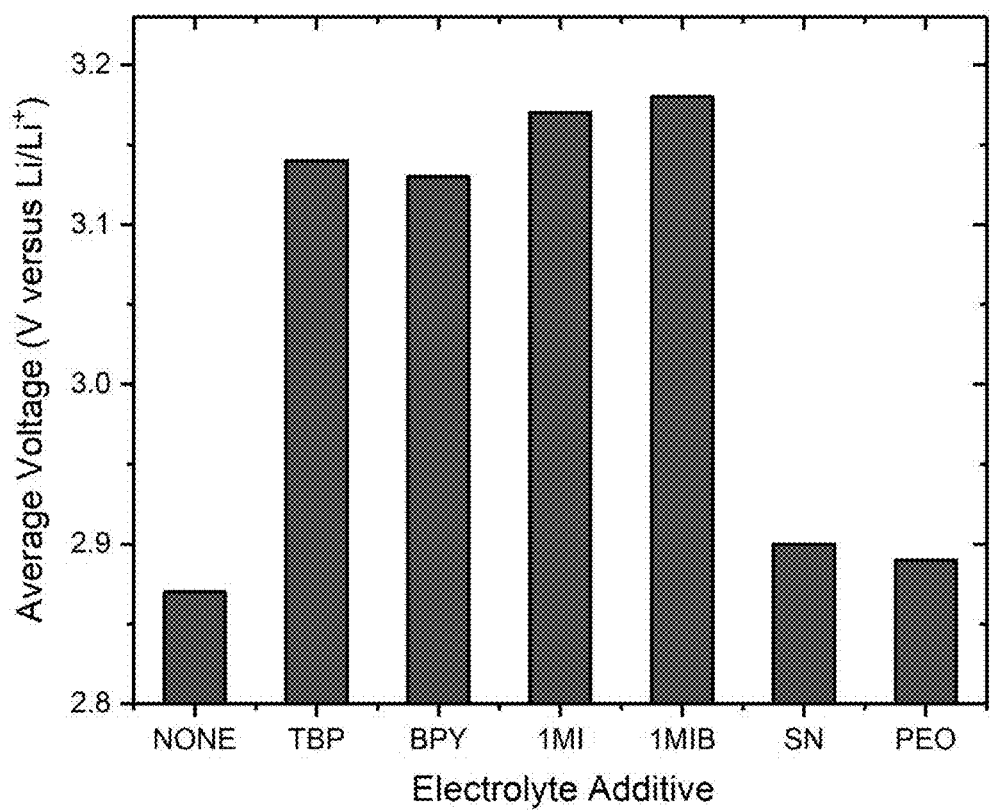
FIG. 14 is a plot showing the average operating voltage of a battery comprising a halogenated compound as a cathode active material, an aliphatic nitrile compound as an electrolyte, a heterocyclic compound with a nitrogen atom in its ring as an electrolyte additive, a plasticizer, a carboxylic acid, and carbon dioxide, as a function of the electrolyte additive.

FIG. 14 plots operating discharge voltage for batteries with different electrolyte additives. The data show an increase in the average operating voltage for TBP, BPY, MI, MIB as the electrolyte additive, while SN and PEO afforded very little increase in operating voltage over batteries having no electrolyte additive at all. The data shows batteries according the present disclosure achieve high average operating discharge voltage of 3.1V or above with the use of the heterocyclic compound in the electrolyte solution.

Electrochemical Utilization

To test the effect of the greenhouse gas atmosphere on the electrochemical utilization of active electrode materials in batteries according to the present disclosure, oxidation and reduction peak currents were measured under argon and carbon dioxide atmosphere. Batteries were prepared in the same manner as described above for Examples 1-9. A solution including lithium iodide and succinonitrile in diethyl ether was dropcast onto a 316L stainless steel mesh current collector that had been coated with a conductive porous carbon via electrospraying. The current collector with the casted solution was then dried under vacuum at room temperature for 12 hours. MIB was used as the electrolyte additive. After cell assembly within an argon-filled glovebox (<0.1 ppm $O_2$, <0.1 ppm $H_2O$), one cell was removed from the glovebox, purged, and filled with carbon dioxide (Example 11), while the argon atmosphere was left intact for the other cell (Example 12).

Figure 15:
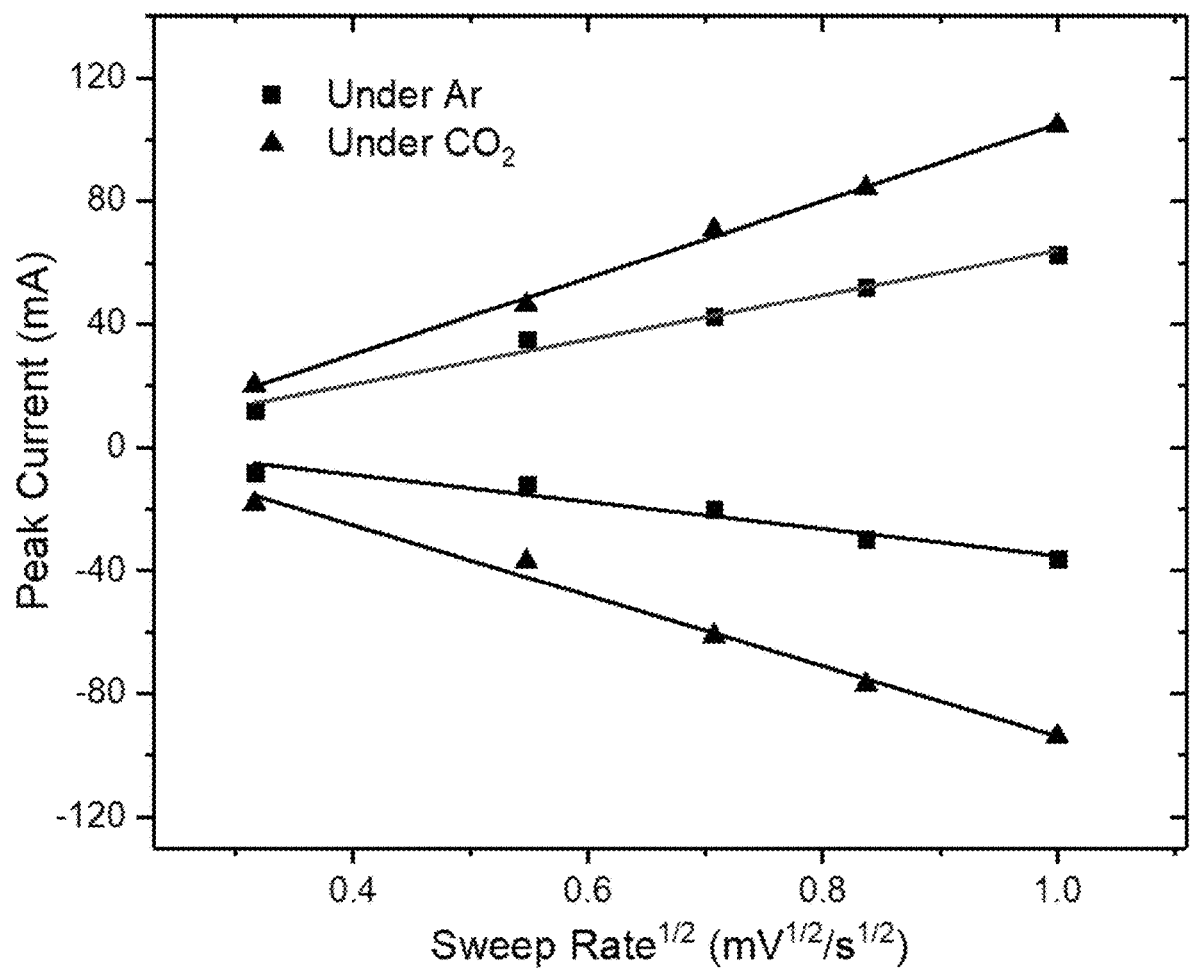
FIG. 15 is a plot showing the electrochemical utilization of the active materials of a battery comprising a halogenated compound as a cathode active material, an aliphatic nitrile compound as an electrolyte, a heterocyclic compound with a nitrogen atom in its ring as an electrolyte additive, a plasticizer, a carboxylic acid, and carbon dioxide, at different sweeping rates.

FIG. 15 shows the electrochemical utilization by plotting oxidation and reduction currents at different sweep rates for Example 11 ($CO_2$) and Example 12 (Ar). Example 11 ($CO_2$) exhibited higher oxidation and reduction peak currents at all sweep rates, when compared to a battery operated under argon (Example 12). The result shows that the presence of carbon dioxide improves the utilization of the active electrode materials.

Effect of Dissolved Greenhouse Gas Concentration on Specific Capacity

To demonstrate the effect of dissolved greenhouse gas concentration on the specific capacity of batteries according to the present disclosure, batteries were prepared using electrolytes that had been prepared under different carbon dioxide gas overpressures, with higher overpressures corresponding to higher concentrations of dissolved carbon dioxide gas in the electrolyte. Batteries were prepared in the same manner as described above for Examples 1-12, with MIB as the electrolyte additive. However, for each battery, the electrolyte material was exposed to a different carbon dioxide overpressure to dissolve different concentrations of carbon dioxide in the electrolyte (FIG. 5). The electrolyte solution was kept under the carbon dioxide atmosphere for 1 hour for each pressure. Cell assembly was carried out in an argon-filled glovebox (<0.1 ppm $O_2$, <0.1 ppm $H_2O$).

Figure 16:
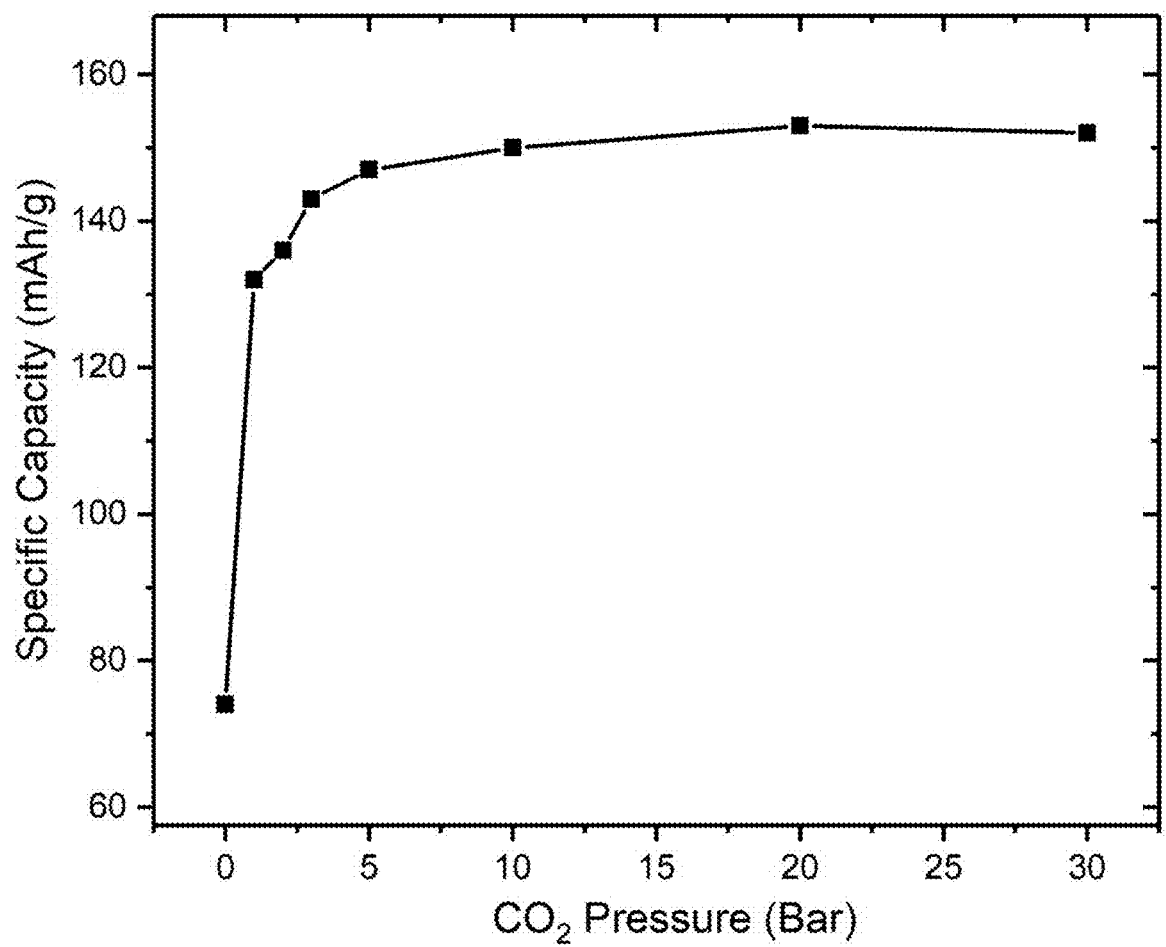
FIG. 16 is a plot showing specific capacity of a battery comprising a halogenated compound as a cathode active material, an aliphatic nitrile compound as an electrolyte, a heterocyclic compound with a nitrogen atom in its ring as an electrolyte additive, a plasticizer, a carboxylic acid and carbon dioxide, as a function of the carbon dioxide pressure in the experimental setup used to dissolve the carbon dioxide in the electrolyte.

FIG. 16 shows an increase in the specific capacity of batteries according to the present disclosure, as a function of the carbon dioxide pressure used to dissolve carbon dioxide in the electrolyte. For relatively low $CO_2$ pressures, specific capacity shows a sharp increase with small pressure increases, indicating an increase concentration of dissolved $CO_2$ enhances the specific capacity of the battery. The battery exhibited its highest specific capacity of over 150 mAh/g with the carbon dioxide pressure of 10 bar or greater for the liquid electrolyte storage. Increased carbon dioxide pressure beyond 10 bar provided minimal, if any, increase in specific capacity.

Effect of Internal Greenhouse Gas Pressure on Specific Capacity

To demonstrate the effect of internal greenhouse gas pressure on the specific capacity of batteries according to the present disclosure, batteries were prepared in the same manner as described above for Examples 1-12, with MIB as the electrolyte additive. However, for each battery, the internal carbon dioxide pressure inside the cell was varied when the cell was removed from the glovebox, purged, and filled with carbon dioxide gas.

Figure 17:
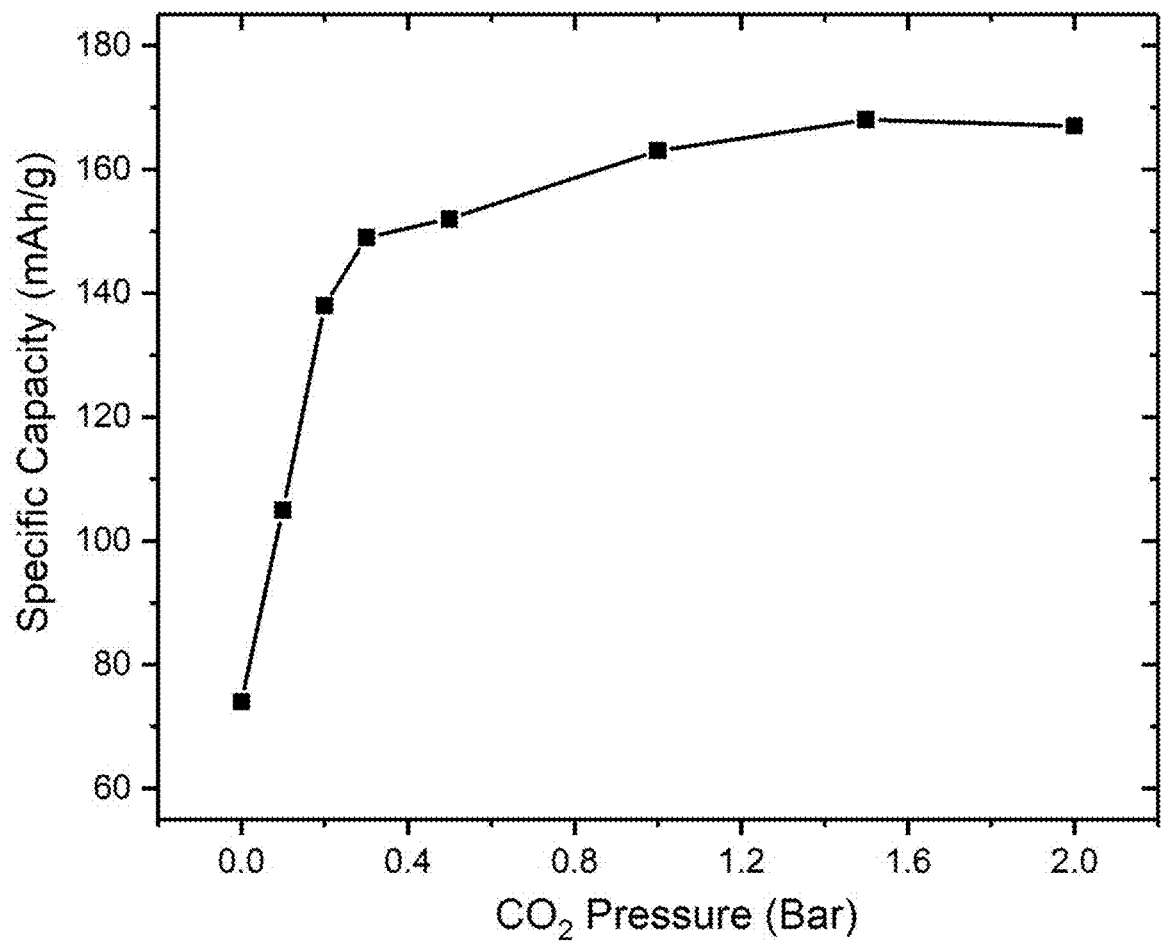
FIG. 17 is a plot showing the specific capacity of a battery comprising a halogenated compound as a cathode active material, an aliphatic nitrile compound as an electrolyte, a heterocyclic compound with a nitrogen atom in its ring as an electrolyte additive, a plasticizer, a carboxylic acid, and carbon dioxide, as a function of the carbon dioxide pressure in the cell atmosphere.

FIG. 17 shows the increase in the specific capacity of a battery with respect to the carbon dioxide pressure in the cell atmosphere. The battery demonstrated its highest specific capacity of over 160 mAh/g at the carbon dioxide pressure of 1 bar or greater in the cell atmosphere.

Effect of Internal Greenhouse Gas Pressure on Self-Discharge Rate

To demonstrate the effect of internal greenhouse gas pressure on the self-discharge rate of batteries according to the present disclosure, batteries were prepared in the same manner as described above for Examples 1-12, with MIB as the electrolyte additive. However, for each battery, the internal carbon dioxide pressure inside the cell was varied when the cell was removed from the glovebox, purged, and filled with carbon dioxide gas.

Figure 18:
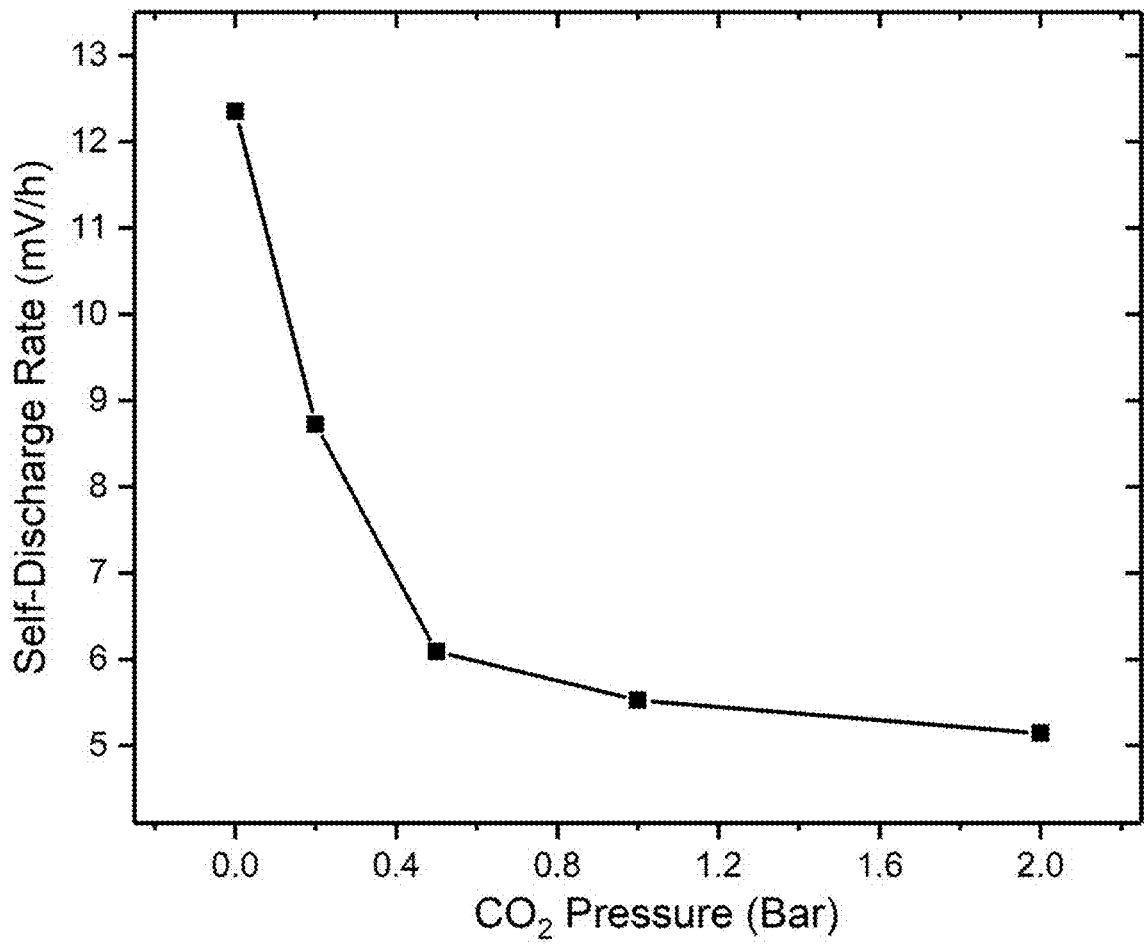
FIG. 18 is a plot showing self-discharge rate of a battery comprising a halogenated compound as a cathode active material, a plasticizer, a carboxylic acid, and carbon dioxide, as a function of the carbon dioxide pressure in the cell atmosphere.

FIG. 18 shows the decrease in self-discharge rate of batteries according to the present disclosure with respect to the carbon dioxide pressure in the cell atmosphere. The battery demonstrated its lowest self-discharge rate of approximately 5 mV/h at an internal carbon dioxide pressure of 1 bar or greater.

Effect of Plasticizer on the Specific Capacity, Coulombic Efficiency, and Self-Discharge Rate To demonstrate the effect of plasticizer concentration on the specific capacity, coulombic efficiency, and self-discharge rate of batteries according to the present disclosure, batteries were prepared in the same manner as described above for Examples 1-12, but with varied concentrations of succinonitrile (SN) as the plasticizer material in the cathode active material.

Figure 19:
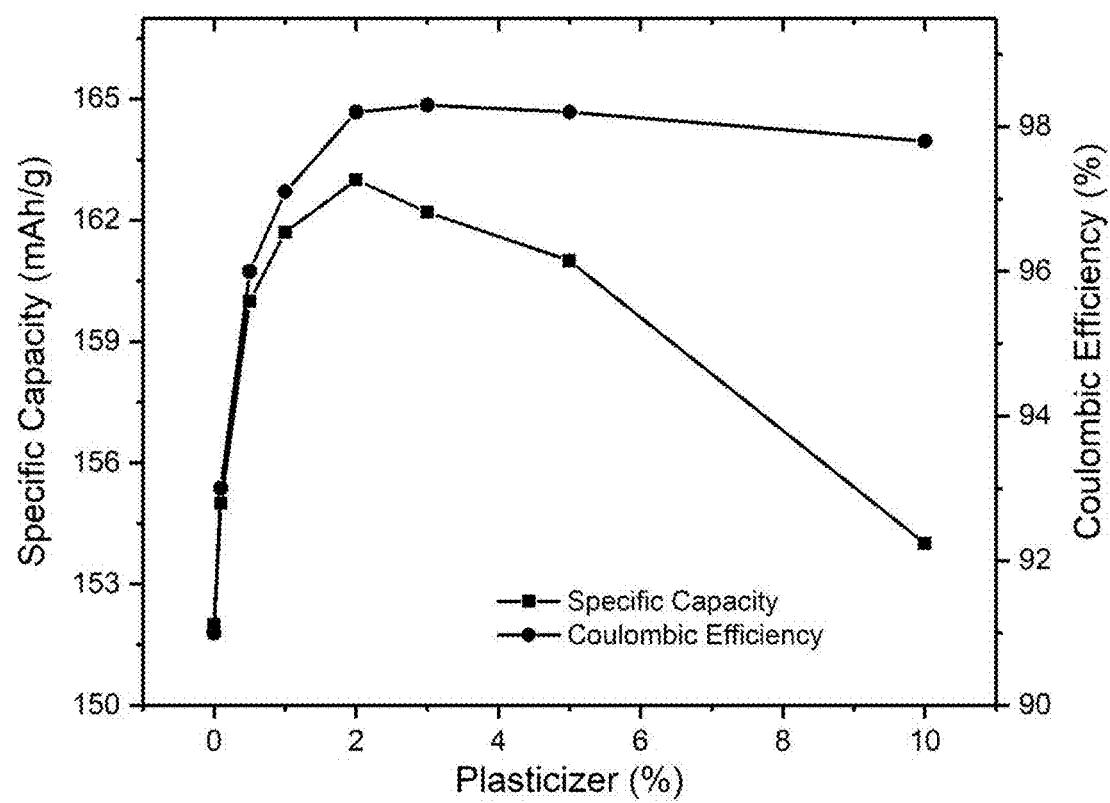
FIG. 19 is a plot showing the specific capacity and the coulombic efficiency of a battery comprising a halogenated compound as a cathode active material, an aliphatic nitrile compound as an electrolyte, a heterocyclic compound with a nitrogen atom in its ring as an electrolyte additive, a plasticizer, a carboxylic acid, and carbon dioxide, as a function of the plasticizer concentration.

FIG. 19 plots the increase in the specific capacity and the coulombic efficiency of a battery with respect to the plasticizer concentration. As used herein, the term "coulombic efficiency" is intended to mean the ratio of the total charge extracted from the battery to the total charge put into the battery over a full cycle. The battery exhibited its highest specific capacities of 160 mAh/g or greater and coulombic efficiencies near or exceeding 98% when the plasticizer was present at a concentration of 2%. At higher plasticizer concentrations, the coulombic efficiency remained steady, while the specific capacity decreased markedly when the plasticizer concentration exceeded about 3%.

Figure 20:
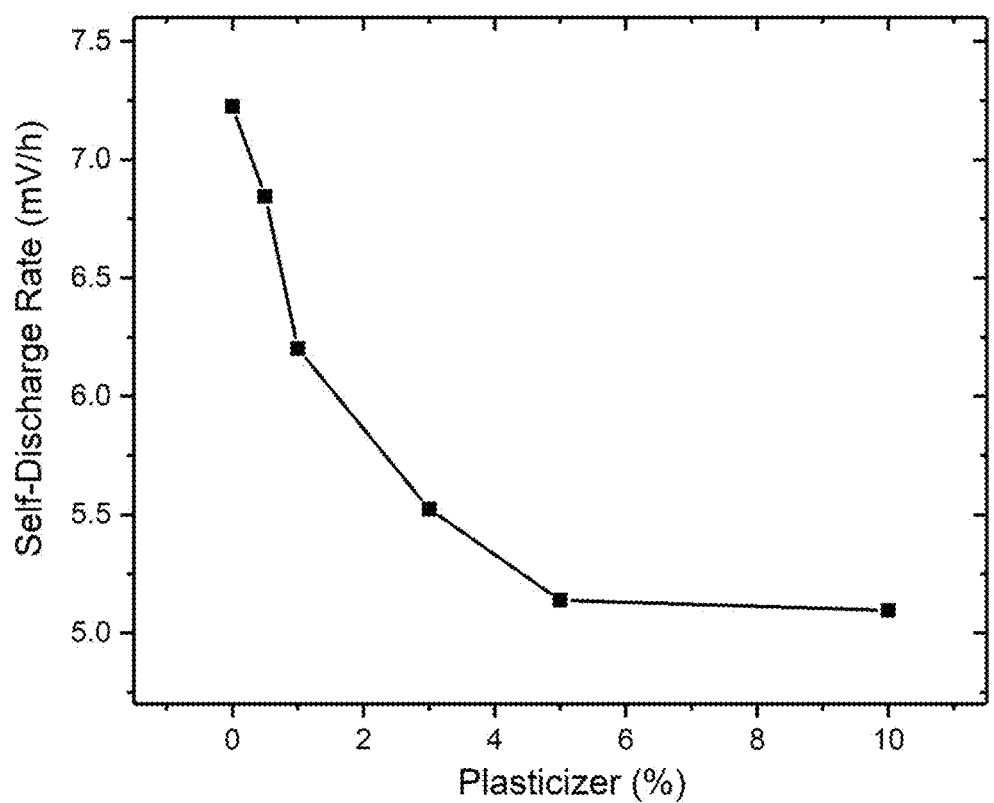
FIG. 20 is a plot the self-discharge rate of a battery comprising a halogenated compound as a cathode active material, an aliphatic nitrile compound as an electrolyte, a heterocyclic compound with a nitrogen atom in its ring as an electrolyte additive, a plasticizer, a carboxylic acid, and carbon dioxide, as a function of the plasticizer concentration.

FIG. 20 plots the self-discharge rate as a function of plasticizer concentration. The battery demonstrated its lowest self-discharge rates of approximately 5 mV/h when the plasticizer concentration exceeded about 3 wt. % of the cathode composition.

Battery Life

To test the battery life of batteries according to the present disclosure, batteries were prepared in the same manner as disclosed above for Examples 1-12, with the addition of PEO to the electrolyte. In particular, a solution including lithium iodide and succinonitrile in diethyl ether was dropcast onto a 316L stainless steel mesh current collector that had coated with a conductive porous carbon via electrospraying. The current collector with the casted solution was then dried under vacuum at room temperature for 12 hours. However, in this experiment, 0.9M $LiPF_6$ EC-DEC-DMC-EMC (1:1:1:3 in a volume ratio) quaternary carbonate electrolyte solution was used to test the cycle life of the battery at 0° C. operating temperature. MI was selected for the heterocyclic electrolyte additive, oxalic acid as a carboxylic acid, and succinonitrile for the plasticizer. Poly (ethylene oxide) (PEO) was added to the electrolyte at a concentration of 1 wt. %. The electrolyte comprised dissolved carbon dioxide. The cell assembly was done in an argon-filled glovebox (<0.1 ppm $O_2$, <0.1 ppm $H_2O$), and the cell was purged and introduced with carbon dioxide outside of the glovebox.

Figure 21:
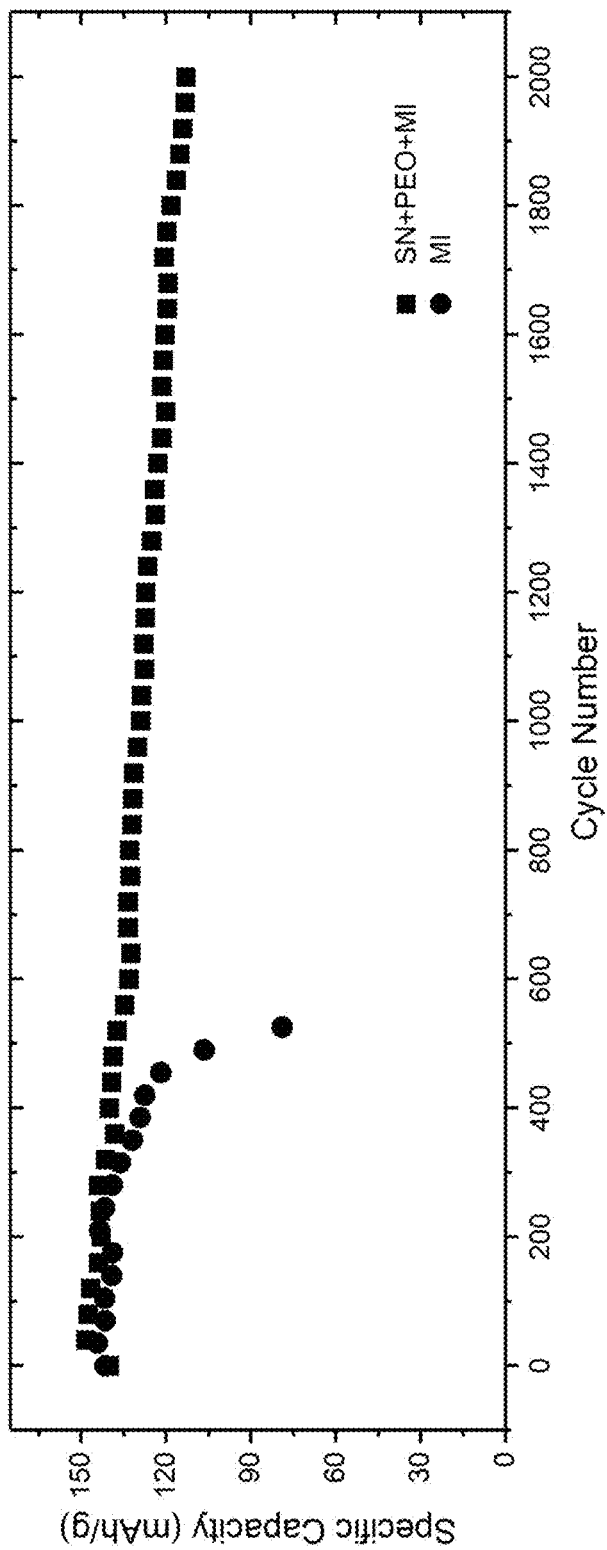
FIG. 21 is a plot showing the superior cycle life (at 0° C. operating temperature) of a battery comprising a halogenated compound as a cathode active material, a heterocyclic compound with a nitrogen atom in its ring as an electrolyte additive, a plasticizer, a carboxylic acid, and carbon dioxide.

FIG. 21 is a plot showing the superior cycle life at an operating temperature of 0° C., for a battery comprising a halogenated compound as a cathode active material, an electrolyte comprising three carbonate compounds, a heterocyclic compound with a nitrogen atom in its ring as an electrolyte additive, a polymeric additive, succinonitrile as a plasticizer, oxalic acid as a carboxylic acid and a carbon dioxide atmosphere. The battery demonstrated its superior cycle number of 2,000 relative to a battery lacking PEO or a plasticizer.

The present disclosure has described the use of various features and methods for producing batteries. It should be understood that any combination of such features and methods are within the scope of the present disclosure. For example, an embodiment that describes the use of a halogenated compound for the cathode active material may be modified to be produced under a greenhouse gas-rich atmosphere, and such modification is intended to be within the scope of the present disclosure. Other permutations and combinations that utilize one or more of the features/methods described herein are also possible, and such permutations and combinations are also considered part of the present disclosure without enumerating them specifically.

Notwithstanding the embodiments described above and shown in the accompanying drawing figures, various modifications and inclusions to those embodiments are contemplated and considered within the scope of the present disclosure.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A battery, comprising:
    an anode comprising an anode active material, wherein the anode active material comprises a protective layer coating on an outer surface of the anode active material, wherein the protective layer coating is electrically insulating and has an electrical conductivity of less than $10^{-2}$ S/cm;
    a cathode comprising a halogenated compound as a cathode active material, wherein the halogenated compound comprises at least one metal and one halogen atom, wherein the metal is selected from the group consisting of lithium, sodium, potassium, beryllium, magnesium, calcium, vanadium, iron, nickel, copper, zinc and aluminum;
    an electrolyte comprising an electrolytic solvent, wherein the electrolytic solvent is disposed between the cathode and the anode such that the electrolytic solvent is makes contact with both the cathode and the anode; and
    a gaseous atmosphere that includes a greenhouse gas, wherein the greenhouse gas does not undergo an electrochemical reaction with the anode active material or the cathode active material;
    wherein one or both of the cathode and the anode includes at least one selected from the group consisting of a plasticizer and a carboxylic acid; and wherein the protective layer coating on the outer surface of the anode active material is chemically and/or electrochemically generated by the greenhouse gas.

2. The battery of claim 1, wherein the electrolyte comprises an aliphatic nitrile compound.

3. The battery of claim 1, wherein the cathode active material comprises an organic material having a conjugated cyclic structure.

4. The battery of claim 1, wherein the greenhouse gas is selected from the group consisting of carbon dioxide ($CO_2$), carbon monoxide (CO), ozone ($O_3$), methane ($CH_4$), tetrafluoromethane ($CF_4$), hexafluoroethane ($C_2F_6$), sulfur hexafluoride ($SF_6$), carbon tetrachloride ($CCl_4$), nitrous oxide ($N_2O$), sulfur dioxide ($SO_2$), carbon disulfide ($CS_2$), and carbonyl sulfide (COS).

5. The battery of claim 1, wherein the battery is configured so that the gaseous atmosphere of the battery can be purged from the battery and replaced.

6. The battery of claim 1, further comprising a cathode current collector, wherein the cathode current collector comprises a metal alloy having at least one material selected from the group consisting of molybdenum, titanium, zirconium, and combinations thereof.

7. The battery of claim 1, wherein the anode active material comprises a metal oxide.

8. The battery of claim 7, wherein the metal oxide comprises one or more of titanium, niobium, or vanadium.

9. The battery of claim 1, wherein the cathode active material further comprises a second protective layer coating on an outer surface of the cathode active material, wherein the second protective layer coating is electrically insulating and has an electrical conductivity of less than $10^{-2}$ S/cm; wherein the second protective layer coating on the outer surface of the cathode active material is chemically and/or electrochemically generated by the greenhouse gas.

10. The battery of claim 1, further comprising an anode current collector, wherein the anode current collector comprises a metal alloy having at least one material selected from the group consisting of molybdenum, titanium, zirconium, and combinations thereof.

11. The battery of claim 1, wherein one or both of the cathode and the anode comprises an electrically-conductive material that is a porous carbon material selected from the group consisting of carbon black, carbon nanotubes, carbon nanofibers, carbon dots, activated carbon, graphite, graphene, graphene oxide, reduced graphene oxide, graphene nanoribbons, and combinations thereof.

12. The battery of claim 11, wherein the porous carbon material is doped with one or more heteroatoms selected from the group consisting of boron, oxygen, nitrogen, sulfur, phosphorous, fluorine, chlorine, bromine, and combinations thereof.

* * * * *